(12) United States Patent
Nguyen et al.

(10) Patent No.: US 10,405,307 B2
(45) Date of Patent: Sep. 3, 2019

(54) METHOD FOR REALIZING ECA SUPPORTING UP TO 32 CCS AND ENHANCING DYNAMIC PUCCH RESOURCE ALLOCATION FOR ASSOCIATED USE

(71) Applicant: NEC CORPORATION, Tokyo (JP)

(72) Inventors: Phong Nguyen, Victoria (AU); Pushpika Wijesinghe, Victoria (AU)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/572,272

(22) PCT Filed: Nov. 16, 2015

(86) PCT No.: PCT/JP2015/083514
§ 371 (c)(1),
(2) Date: Nov. 7, 2017

(87) PCT Pub. No.: WO2016/189766
PCT Pub. Date: Dec. 1, 2016

(65) Prior Publication Data
US 2018/0295608 A1    Oct. 11, 2018

(30) Foreign Application Priority Data

May 28, 2015    (AU) ................................. 2015901985

(51) Int. Cl.
*G01R 31/08*    (2006.01)
*H04W 72/04*    (2009.01)
(Continued)

(52) U.S. Cl.
CPC ............. *H04W 72/042* (2013.01); *H04L 5/00* (2013.01); *H04L 5/001* (2013.01); *H04L 5/0051* (2013.01);
(Continued)

(58) Field of Classification Search
CPC .................................................... H04W 72/042
See application file for complete search history.

(56) References Cited

U.S. PATENT DOCUMENTS

2011/0310759 A1\* 12/2011 Gerstenberger ........ H04L 5/001
370/252
2012/0155312 A1\* 6/2012 Kim ...................... H04W 24/10
370/252
(Continued)

OTHER PUBLICATIONS

3rd Generation Partnership Project; Technical Specification Group Radio Access Network; Evolved Universal Terrestrial Radio Access (E-Utra); Physical layer procedures, 3GPP TS 36.213 V12.5.0, Mar. 2015, 239 pages.
(Continued)

*Primary Examiner* — Gerald A Smarth
(74) *Attorney, Agent, or Firm* — Sughrue Mion, PLLC

(57) ABSTRACT

A control signalling method for use in advanced communication networks is proposed. The method provides for self-scheduling carrier aggregation, cross-carrier scheduling carrier aggregation, and hybrid-scheduling carrier aggregation for downlink data transmission on up to 32 concurrent downlink component carriers where the UE feedback on downlink data is transmitted on a single uplink component carrier.

20 Claims, 18 Drawing Sheets

(51) Int. Cl.
*H04L 5/00* (2006.01)
*H04W 72/12* (2009.01)
(52) U.S. Cl.
CPC ...... *H04W 72/044* (2013.01); *H04W 72/1289* (2013.01)

(56) References Cited

U.S. PATENT DOCUMENTS

| | | | | |
|---|---|---|---|---|
| 2012/0243498 | A1* | 9/2012 | Kwon | H04L 5/00 370/329 |
| 2013/0322355 | A1* | 12/2013 | Seo | H04L 1/1861 370/329 |
| 2014/0092832 | A1* | 4/2014 | Han | H04L 1/1861 370/329 |
| 2015/0055584 | A1* | 2/2015 | Lee | H04W 72/042 370/329 |
| 2015/0215800 | A1* | 7/2015 | Wu | H04L 5/001 370/252 |

OTHER PUBLICATIONS

RAN1 chairman's notes, 3GPP TSG RAN WG1 Meeting #80, Athens, Greece, Feb. 9-13, 2015, 4 pages, R1-150000.
Way Forward on Scheduling Modes for LAA CCs, 3GPP TSG-RAN WG1 #80b, Apr. 20-24, 2015, 3 pages, R1-152294.
"DL control grouping for LAA", HTC 3GPP TSG RAN WG1 Meeting #81, May 25-29, 2015, 4 pages. R1-153024.
International Search Report for PCT/JP2015/083514 dated Jan. 12, 2016 [PCT/ISA/210].
NTT DOCOMO, Inc, "Necessary enhancements to enable LTE CA of up to 32CCs for DL and UL", 3GPP TSG RAN WG1 Meeting #80, Feb. 2015, R1-150593, total 4 pages.
NEC, "Discussion on DL control signaling enhancements", 3GPP TSG RAN WG1 Meeting #80, Feb. 2015, R1-150293, total 2 pages.
Alcatel-Lucent et al., "Remaining aspect PUCCH on SCell for CA enhancement", 3GPP TSG-RAN WG2 Meeting #80bis, Apr. 2015, R1-151321, total 4 pages.
Communication dated Aug. 14, 2018 from the Japanese Patent Office in counterpart Application No. 2017-558763.
Nokia Corporation et al.: "On DL control signalling for up to 32 component carriers", 3GPP Draft; RI-150495, vol. RAN WG1, No. Athens, Greece; Feb. 9, 2015-Feb. 13, 2015 Feb. 8, 2015 (Feb. 8, 2015); XP050933703.
NEC: "On cross-carrier scheduling for CA beyond 5 CCs", 3GPP Draft; R1-151562, vol. RAN WG1, No. Belgrade, Serbia; Apr. 20, 2015-Apr. 24, 2015; Apr. 19, 2015 (Apr. 19, 2015); XP050934434.
Ericsson: "DL control signaling enhancement for up to 32 CCs", 3GPP Draft; RI-153066, vol. RAN WG1, No. Fukuoka, Japan; May 25, 2015-May 29, 2015; May 24, 2015 (May 24, 2015); XP050973442.
Communication dated Jan. 2, 2019 from the European Patent Office in application No. 15893398.6.
Nokia Networks, "On extension of the cross-carrier scheduling framework to more than 5 CCs", 3GPP TSG-RAN WG1 Meeting #80bis, 2015, R1-152009, 5 pages.
Notice of Grounds for Rejection dated Nov. 30, 2018 from the Korean Intellectual Property Office in counterpart application No. 10-2017-7037540.

* cited by examiner

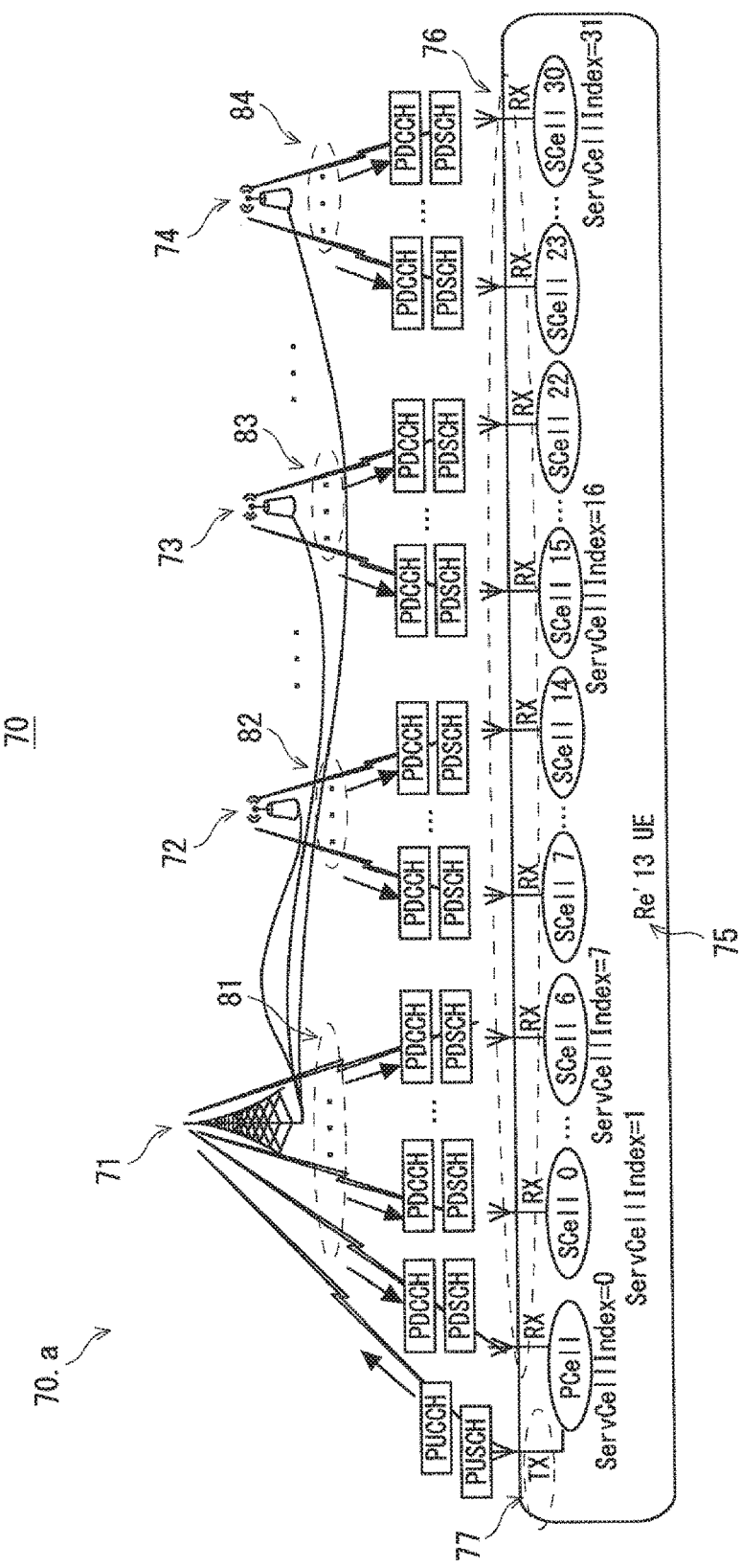

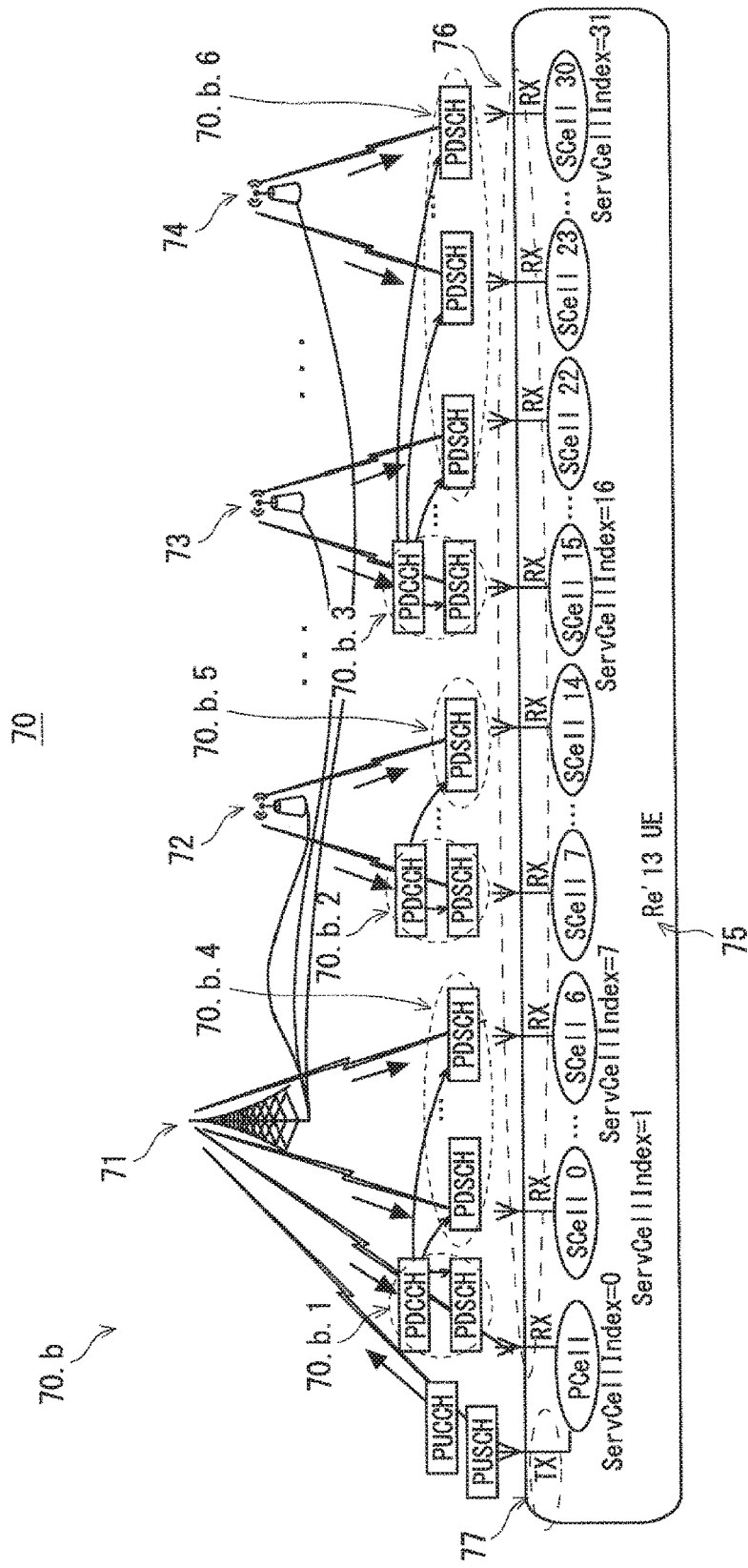

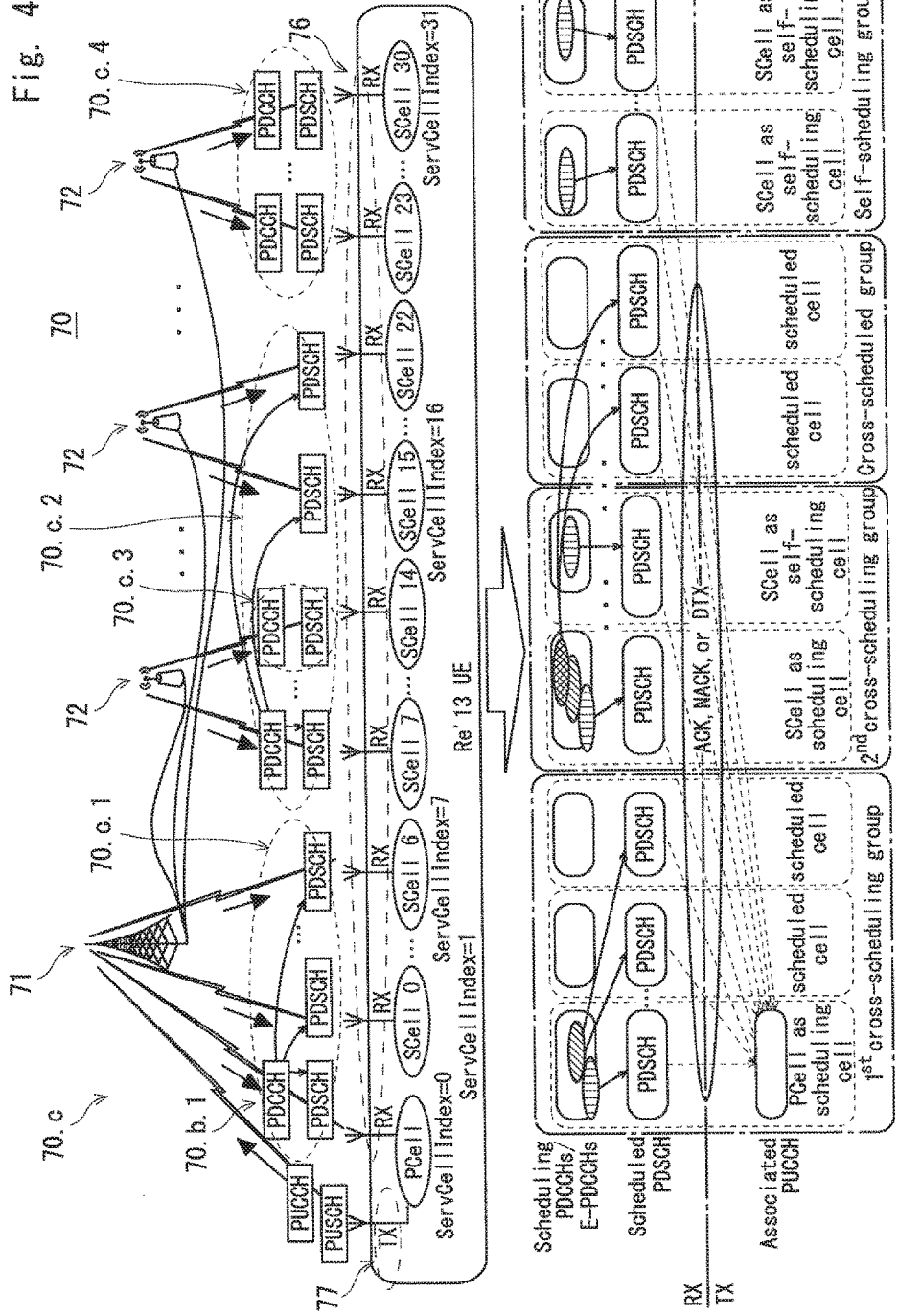

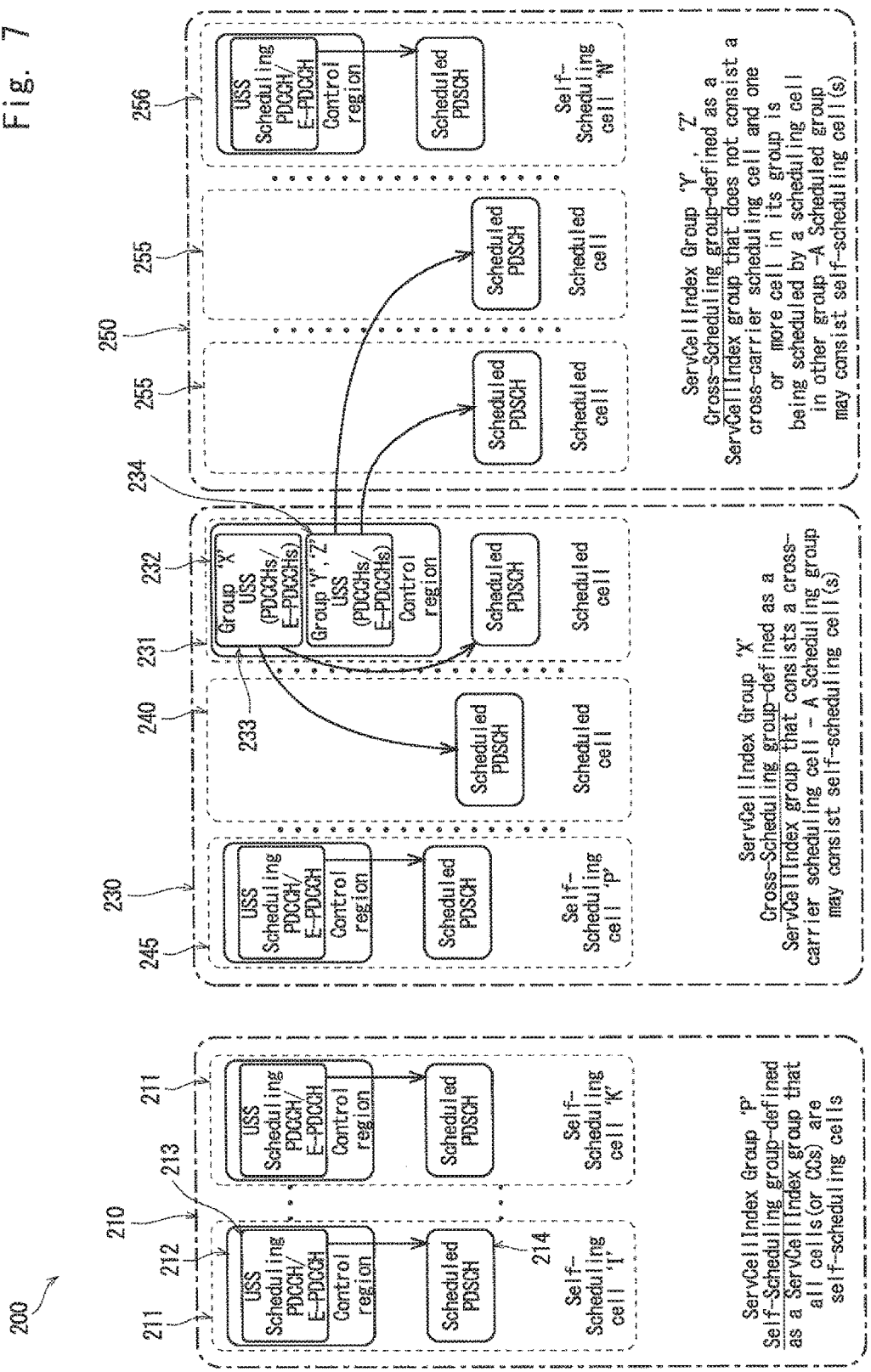

METHOD FOR REALIZING ECA SUPPORTING UP TO 32 CCS AND ENHANCING DYNAMIC PUCCH RESOURCE ALLOCATION FOR ASSOCIATED USE

CROSS REFERENCE TO RELATED APPLICATIONS

This application is a National Stage of International Application No. PCT/JP2015/083514 filed on Nov. 16, 2015, claiming priority based on Australia Patent Application No. 2015-901985 filed on May 28, 2015, the contents of all of which are incorporated herein by reference in their entirety.

TECHNICAL FIELD

The present invention relates generally to control signalling in advanced wireless communication networks. More particularly, the invention relates to enhancing control signalling and operational procedures for (or at least to assist in) realising self-scheduling carrier aggregation, cross-carrier scheduling carrier aggregation, and hybrid-scheduling carrier aggregation for downlink data transmission on up to 32 concurrent downlink component carriers but where UE feedback on downlink data is transmitted on a single uplink component carrier.

BACKGROUND ART

The following abbreviations are used herein.

| | |
|---|---|
| 3GPP | $3^{rd}$ Generation Partnership Project |
| ACK | Positive acknowledgement |
| BS | Wireless access point/base station |
| CA | Carrier Aggregation |
| CC | Component Carrier (i.e. PCell or SCell) |
| CIF | Carrier Indicator Field |
| DCI | Downlink Control Information |
| DL | Downlink |
| DRX | Discontinuous reception |
| DTX | Discontinuous transmission |
| eCA | Enhanced Carrier Aggregation |
| eNB or eNodeB | Evolved NodeB |
| HARQ | Hybrid Automatic Repeat Request |
| L1 | Layer 1 or Physical Layer |
| L2 | Layer 2 or MAC/RLC layer |
| LTE | Long Term Evolution |
| NACK | Negative Acknowledgment |
| PCC | Primary Component Carrier (i.e. PCell) |
| PDCCH | Physical Downlink Control Channel |
| PDSCH | Physical Downlink Shared Channel |
| PRB | Physical Resource Block |
| PUCCH | Physical Uplink Control Channel |
| PUSCH | Physical Uplink Shared Channel |
| Rel'8 or r-8 | LTE Release 8 |
| Rel' 10 or r-10 | LTE Release 10 |
| Rel' 13 or r-13 | LTE Release 13 |
| RRC | Radio Resource Control |
| RX | Receive |
| SCC | Secondary Component Carrier (i.e. SCell) |
| SIB | System Information Broadcast |
| TPC | Transmit Power Control |
| TX | Transmit |
| UCI | Uplink Control Information |
| UE | User Equipment |
| UL | Uplink |
| USS | UE Specific Search Space |

3rd Generation Partnership Project (3GPP) Long Term Evolution (LTE) wireless systems aim to provide enhanced services by means of higher data rates and lower latency with reduced cost. The first release of LTE wireless system (i.e. LTE Release 8) supports flexible bandwidths up to 20 MHz in the uplink (reverse link) and downlink (forward link). The later Release 10, which supports bandwidths larger than 20 MHz and up to 100 MHz, was standardized utilizing the concept of carrier aggregation (CA) to meet the requirements for ITU IMT-Advanced. IMT-Advanced, which stands for "International Mobile Telecommunications-Advanced", are requirements issued by the International Telecommunication Union (ITU) for what is marketed as 4G mobile phone and Internet access services.

With CA, Release 10 and above UEs are able to aggregate up to five component carriers (CCs) to achieve total bandwidths greater than 20 MHz and as high as 100 MHz, as illustrated in FIG. 1. Backward compatibility is achieved by restricting the maximum bandwidth of one component carrier (CC) to 20 MHz with Release 8 structure such that legacy UEs observe each CC as a separate Release 8 carrier.

In Release 10 CA, the number of aggregated CCs and the bandwidth of each CC can be different for uplink (UL) and downlink (DL) providing symmetric or asymmetric configurations. Typically, in asymmetric configurations the number of DL CCs is larger than the number of UL CCs. A CA capable UE is initially configured with one UL/DL CC pair, called primary component carriers (PCC or PCell), on which it makes the initial random access. Depending on the UE capability and the network requirements, the network may configure additional CCs, called secondary component carriers (SCCs or SCells). Up to Release 12, the maximum number of SCells supported by a CA capable UE is four giving a total of five CCs including the PCell.

Additionally, in LTE, a hybrid automatic repeat request (HARQ) mechanism is employed in both uplink and downlink. For a scheduled downlink transmission to a UE, the UE attempts to receive and decode the data packet and feeds back an acknowledgement (i.e. positive: ACK or negative: NACK or DTX) to the eNodeB indicating whether the decoding was successful (ACK) or unsuccessful (NACK) or undetected. At an eNodeB, upon receiving a NACK corresponding to previously sent packet, the eNodeB may retransmit the non-decoded/erroneous/non-detected data packet. At a UE, transmission of acknowledgements for a received downlink data packet is done as a part of uplink control information (UCI)/layer 1 and layer 2 (L1/L2) control information, which are transmitted either on Physical Uplink Control Channel (PUCCH) or multiplexed onto uplink data transmission (if UL is granted in a subframe) on Physical Uplink Shared Channel (PUSCH). Up to Release 12 CA, PUCCH transmission is supported only on the primary uplink CC. This means there is a certain UE Category that is DL-CA capable (only) but non-UL-CA capable—i.e. UEs having multiple receivers (RX) but only a single transmitter (TX). According to LTE Release 10, the HARQ-ACK transmission for up to five DL CCs is done on one PUCCH on the PCell using PUCCH Format 3.

According to LTE Rel'10, when a UE is configured to use PUCCH Format 3 with CA enabled, the UE is further configured, via RRC signalling, with 4 PUCCH format 3 resources. On a DL subframe basis, the eNB dynamically informs the UE which resource (among the 4 configured PUCCH format 3 resources) is to be selected for mapping of the associated PUCCH carrying uplink control information (UCI) and associated transmit power. The eNB uses 2-bits of the Transmit Power Control (TPC) field in the PCell's DCI to dynamically signal the PUCCH power control command and 2-bits of the TPC field in SCell's DCI to dynamically signal the selected PUCCH resource index (the UE may assume the TPC command in all SCells DCI are the same).

In this manner, the scheduler has the flexibility of allocating the same PUCCH resources set for multiple UEs via RRC while avoiding PUCCH collisions between those UEs by dynamically assigning them to different resources on a subframe basis.

Furthermore, in LTE, scheduling of a CC (in the form of downlink assignments/uplink grants) is done using downlink control information (DCI) transmitted on Physical Downlink Control Channel (PDCCH). In LTE Release 8, a UE only operates with one DL CC and one UL CC, and thus there is a clear association between the DL assignments/UL grants and the corresponding DL/UL CC. On the introduction of CA in Release 10, two modes of scheduling were introduced for handling multiple CCs and their association. The first mode of operation, known as self-scheduling, shown in FIG. 2, is a direct extension of the Release 8 concept, where a DL assignment/UL grant contained in a DCI transmitted on a CC is either valid for the DL CC itself or for the associated UL CC. The second mode of operation, known as cross-carrier scheduling, augments a DCI with a carrier indicator field (CIF) such that a DL assignment with CIF is valid for the DL CC indicated by that CIF, and UL grant with CIF is valid for the UL CC indicated by that CIF. In this manner, as illustrated in FIG. 3, PDCCH carrying DCI of one carrier can schedule PDSCH/PUSCH of the same DL carrier/associated UL carrier and one or more other DL carriers/their associated UL carriers, subject to the restriction that one CC can be scheduled by only one other CC and PCC cannot be cross-carrier scheduled.

Further, in Rel'10 LTE cross-carrier scheduling, when one CC schedules one or more other CCs, each scheduled CC has its own UE specific search space in the scheduling CC's control region (PDCCHs). As illustrated in FIG. 3, these UE specific search spaces may overlap with one another depending on the PDCCH capacity of the scheduling cell. The location of the each search space within the scheduling CC's control region is derived as a function of the CIF value which is same as the "servecellindex" of the scheduled CC (see Non Patent Literature 1).

Currently, 3GPP is working towards standardising enhanced carrier aggregation (eCA) to support aggregation on up to 32 component carriers in the downlink for upcoming Release 13. One identified requirement of this is to provide standardised support for aggregating 32 DL CCs with only one UL CC. This is for the UE Category with DL CA capability up to 32 CCs (32 RX) but no UL CA capability (1 TX) (see Non Patent Literature 2). In order to fulfil this requirement, the UE should be capable of reporting HARQ-ACK of up to 32 CCs simultaneously on PUCCH or PUSCHs on the primary UL carrier component. Clearly, the capacity of Release 10 standardized PUCCH format 3 is sufficient only for up to five CC's HARQ-ACK feedback, and therefore, a mechanism is required for transmitting/mapping a new PUCCH format with larger payload size spanning multiple PUCCH resources or PRB-pairs per UE. Additionally, in Rel'10 LTE, cross carrier scheduling is enabled with the use of a 3-bit CIF included in DCI formats for identifying scheduled SCells. Technically, 3-bits CIF can indicate up to 8 CCs, which is more than sufficient for the up to 5 CCs of Rel'10 CA. However, a 3-bit CIF is not sufficient to support cross carrier scheduling for carrier aggregation of up to 32 CCs in Release 13 with full flexibility—that requires at least 5-bits. However, extension of CIF to 5-bits is not preferred due to increased DCI overhead and specification rework.

Thus, there appears to be a need for a way to support efficient PUCCH resource allocation/collision handling and a mechanism to enhance flexible scheduling on up to 32 CCs per UE. Preferably this may be achieved while also achieving full backward compatibility with prior LTE's releases and also with the introduction of minimal rework through e.g. high layer signalling enhancement and operational procedure enhancement.

It is to be clearly understood that mere reference herein to any previous or existing apparatus, products, systems, methods, procedures, protocols, mechanisms, practices, publications (including the References and standard releases referred to herein) or any other information, or to any problems or issues, does not constitute an acknowledgement or admission that any of those things, whether individually or in any combination, formed part of the common general knowledge of those skilled in the field, or that they are admissible prior art.

CITATION LIST

Non Patent Literature

NPL 1: TS 36.213
NPL 2: RAN1 chairman's notes, 3GPP TSG RAN WG1 Meeting #80, Athens, Greece, 9-13 Feb. 2015

SUMMARY OF INVENTION

This section entitled Summary of the Invention provides only an introductory overview of the present invention and some of its features and aspects. A more detailed explanation of various features, benefits and the operation of the invention (or aspects or embodiments thereof), and of various implementational details, is given in the Description of Embodiments section below.

In one broad form, the present invention relates to a control signaling method for use in an advanced wireless communication system. The wireless communication system includes: an Evolved NodeB (eNB); and at least one advanced user equipment (UE) and optionally at least one legacy user equipment (legacy UE). The wireless communication system is capable of carrier aggregation (CA) with up to 32 downlink (DL) component carriers (CCs or cells) but only a single uplink (UL) CC, and control signaling between the eNB and a UE is operable in the following CA modes: a self-scheduling mode wherein the control signaling method comprises performing control signaling between the eNB and the UE such that all CCs are configured as self-scheduling CCs; a cross-carrier scheduling mode wherein the control signaling method comprises performing control signaling between the eNB and the UE such that one or more DL CC(s) is/are configured as scheduling CC(s) which provide scheduling information for DL data reception at the UE on the remaining CCs as scheduled CCs; and a hybrid CA mode wherein the control signaling method comprises performing control signaling between the eNB and the UE such that the UE is configured to operate in the cross-carrier scheduling mode on a group or groups of DL CCs and in the self-scheduling mode on the remaining DL CCs.

By way of further explanation, in summary, the present invention relates generally to an advanced wireless communication system, and methods implemented by or using the system's eNB and the one or more UEs, that support enhanced Carrier Aggregation (eCA) where a single wireless access point (base station—BS), or multiple coordinated wireless access points (BSs), may be simultaneously scheduled for downlink (DL) data transmission in a carrier aggregation fashion on up-to 32 DL component carriers (CCs or Cells) to an advanced user equipment (UE) and the UE feedback for the configured DL CCs is transmitted on a single UL CC. Among the DL-CCs, all CCs may be configured as self-scheduling CCs (i.e. a self-scheduling mode); or one CC or more CCs may be configured as scheduling CCs providing scheduling information for DL data transmission on their own CCs and on the remaining scheduled CCs (i.e. a cross-carrier-scheduling mode); or one CC or more CCs may be configured as scheduling CCs providing scheduling information for DL data transmission on their own CCs and some scheduled CCs, and the remaining CCs may be further configured as self-scheduling CCs (i.e. a hybrid CA mode).

The 32 configured DL CCs may be grouped into 4 groups where each group comprises at most 8 servicing cell indexes or CCs that in turn is/are represented by a 3-bit field. A 2-bit field is used to represent group-index. In the self-scheduling mode a UE is configured with self-scheduling CCs and the group that includes the PCell may be identified as the primary self-scheduling group while the others may be identified as secondary self-scheduling groups. In the cross-carrier-scheduling CA mode, a UE is configured with scheduling CCs and scheduled CCs, and the group that comprises a scheduling CC may be identified as a cross-scheduling group and other group(s) that comprise(s) only scheduled CCs may be identified as cross-scheduled group(s). In the hybrid CA mode, there may be one or more CCs in a cross-scheduling or cross-scheduled group that is/are configured as self-scheduling CCs.

Prior to a CA operation, via RRC connection, the eNB may configure a UE with serving cell indexes and group indexes, self-scheduling cell indexes and/or scheduling-cell and associated scheduled cell indexes. Similar to Rel'10 CA, the eNB may further configure the UE with a set of 4 PUCCH resource indexes.

During self-scheduling CA operation, the eNB may utilise 2 unused bits of the TPC field in the DCIs in secondary self-scheduling group(s) to dynamically inform a UE of the PUCCH resource index offset, thereby providing the eNB an opportunity to further utilise the set of 11 PUCCH resource indexes for dynamic scheduling of PUCCH transmission.

During cross-carrier-scheduling CA operation, the eNB may utilise 2 unused bits of the TPC field in the DCIs on CCs in cross-scheduled group(s) to identify a scheduled-cell with index higher than 8 and up-to 31. Furthermore, during cross-carrier-scheduling CA operation, the eNB may configure a UE to have more than 1 scheduling-cells and dynamically inform the UE to select more than 1 PUCCH resource index (within the semi-static configured set of 4) for transmitting one or more PUCCHs at the same or different transmit power adjustment.

During hybrid CA operation, the eNB may configure a UE to have 1 or more self-scheduling cells within a cross-scheduling and/or associated cross-scheduled group(s). The eNB may further utilise 2 unused bits of the TPC field in the DCIs on the self-scheduling cells to dynamically inform a UE of the specific PUCCH resource index offset, thereby giving the eNB an opportunity to further utilise the set of up-to 16 PUCCH resource indexes (in reference to the selected PUCCH resource index for that cross-scheduling group) for dynamic scheduling PUCCH transmission. Additionally, during hybrid CA operation, where one or more self-scheduling groups are configured, the eNB may further use 2 unused bits of the TPC field in the DCIs in the configured self-scheduling group(s) to dynamically inform a UE the common PUCCH resource index offset to be used in addition to the specific PUCCH resource index offset.

Any of the features described above, or described elsewhere herein, can be combined in any combination with any one or more of other features described herein within the scope of the invention.

BRIEF DESCRIPTION OF DRAWINGS

Preferred features, embodiments, benefits and the operation of the invention, and various implementational details, may be discerned from the following Description of Embodiments section which provides sufficient information for those skilled in the art to perform the invention. The Description of Embodiments is not to be regarded as limiting the scope of the invention, as outlined in preceding Summary of the Invention section, in any way. The Description of Embodiments will make reference to a number of drawings as follows.

FIG. 4A illustrates Advanced Wireless communication system—with DL-CA up to 32 CCs and No UL-CA.

FIG. 4B illustrates Advanced Wireless communication system—with DL-CA up to 32 CCs and No UL-CA.

FIG. 4C illustrates Advanced Wireless communication system—with DL-CA up to 32 CCs and No UL-CA.

FIG. 7 illustrates CA Group definitions.

DESCRIPTION OF EMBODIMENTS

Figure 1:
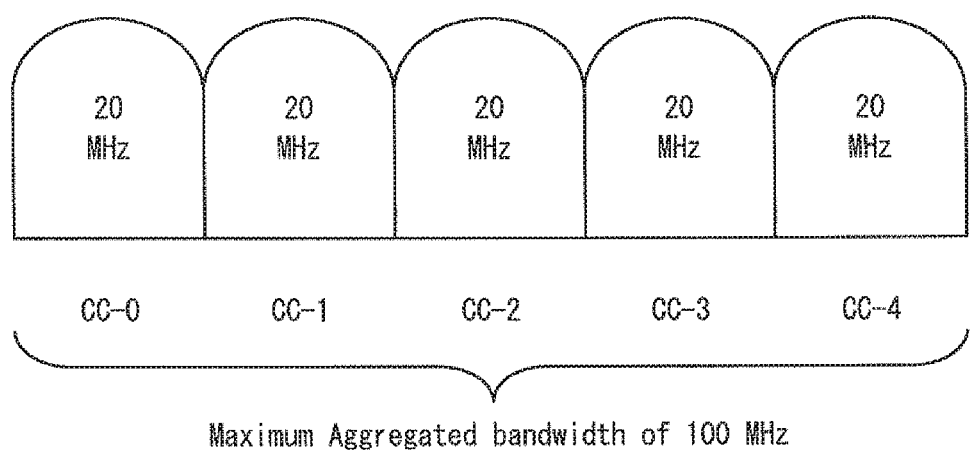
FIG. 1 illustrates Carrier Aggregation in 3GPP LTE Release 10.
Figure 2:
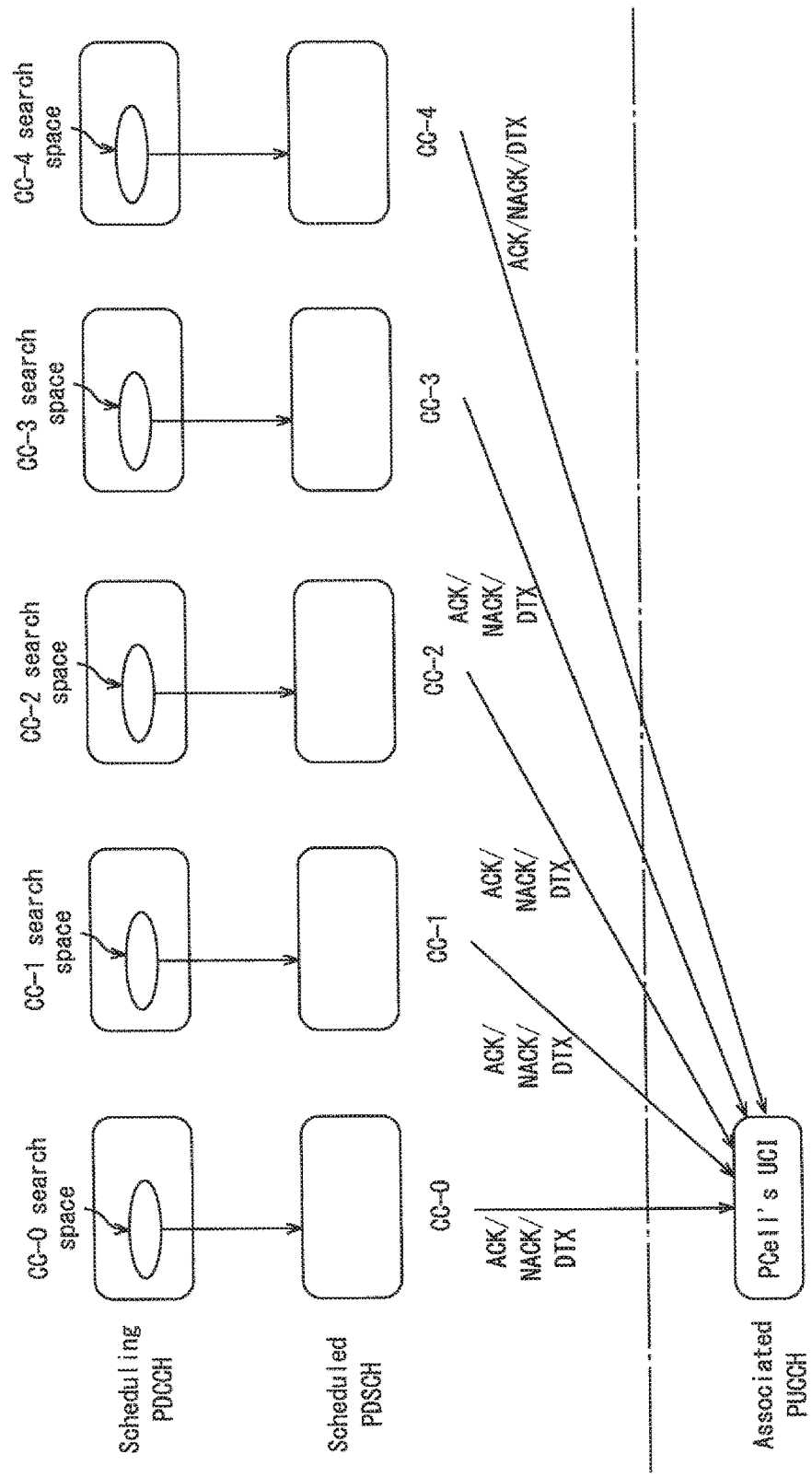
FIG. 2 illustrates Rel'10 Self-Scheduling Carrier Aggregation.
Figure 3:
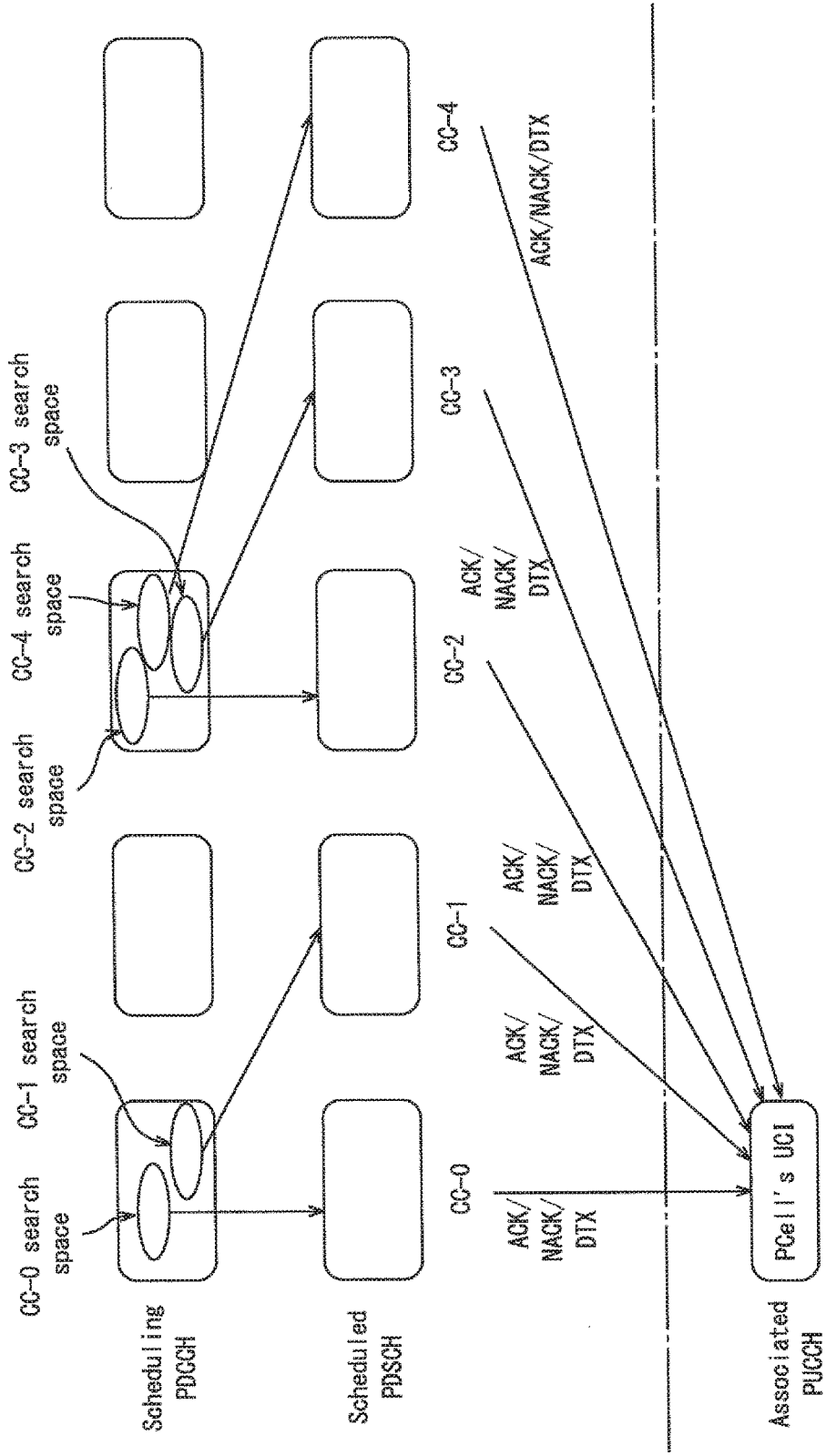
FIG. 3 illustrates Rel'10 Cross-Carrier-Scheduling Carrier Aggregation.

As mentioned above, the proposals presented herein relate to, and will be implemented in, an advanced wireless communication system that supports enhanced Carrier Aggregation (eCA) where a single wireless access point (BS) may be scheduled, or multiple coordinated wireless access points (BSs) may be simultaneously scheduled, in either case by an advanced eNodeB, for downlink data transmission in a carrier aggregation fashion on up to 32 component carriers (CCs or Cells) to an advanced user equipment (UE).

An advanced wireless communication system (70) is illustrated in FIGS. 4A to 4C. In FIGS. 4A to 4C, the communication system (using the present proposal as discussed herein) is servicing not only one or more legacy UEs (i.e. Rel'8, Rel'10 UEs which are not illustrated) but also one or more advanced UEs (75) (i.e. Rel'13 UEs). The Rel'13 UE(s) (75) is/are capable of having up to 32 receivers supporting CA on up to 32 component carriers (CCs) in downlink (76) but only a single transmitter supporting No-UL-CA (77). The communication system also has an advanced eNodeB (not illustrated) that manages the one or more wireless access points (71, 72, 73, 74, etc) for scheduling DL data transmission on multiple CCs (81, 82, 83, 84), and UEs send UL feedback or data on a designated UL CC (77).

FIGS. 4A to 4C illustrate three configurations:

In the $1^{st}$ CA configuration (70.$a$) in FIG. 4A, the eNodeB configures a given UE (75) to operate in no-cross-carrier scheduling mode (i.e. in a self-scheduling mode) where all CCs (i.e. up to 32 CCs including the PCell) are configured by the eNB as self-scheduling CCs;

In the $2^{nd}$ CA configuration (70.$b$) in FIG. 4B, the eNodeB configures a given UE (75) to operate in a cross-carrier scheduling mode where one or more (up to 4) DL CCs is/are configured as scheduling carrier/carriers (70.$b$.1, 70.$b$.2, 70.$b$.3) to provide scheduling information for DL data reception at the UE (75) on the remaining configured CCs (i.e. up-to 31 CCs) as scheduled carriers (70.$b$.4, 70.$b$.5, 70.$b$.6);

In the $3^{rd}$ so called "hybrid" CA configuration (70.$c$) in FIG. 4C, the eNodeB configures a given UE (75) to operate in cross-carrier scheduling mode on a group or groups of suitable DL CCs (70.$c$.1, 70.$c$.2) and further configures the remaining DL CCs as self-scheduling carriers (70.$c$.3, 70.$c$.4).

Figure 5:
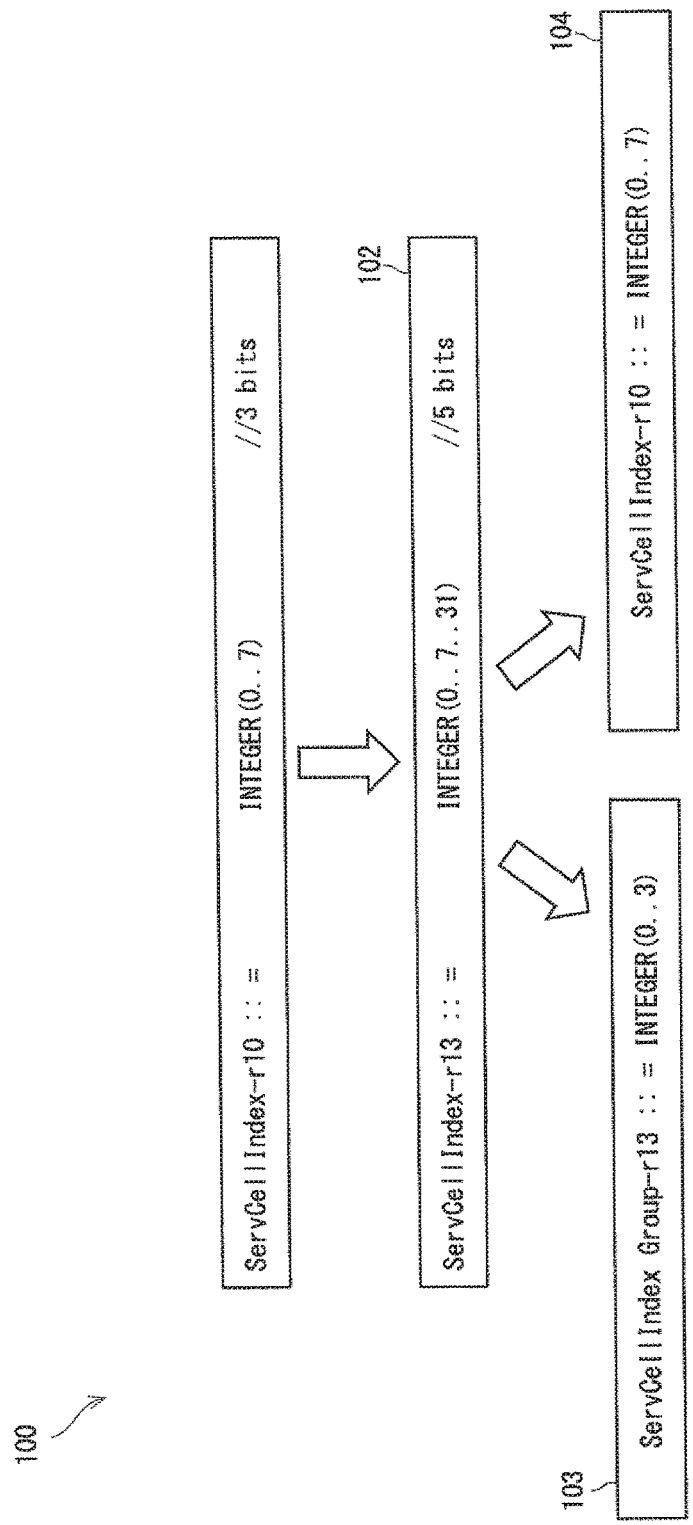
FIG. 5 illustrates Indexing servicing carrier components.
Figure 6:
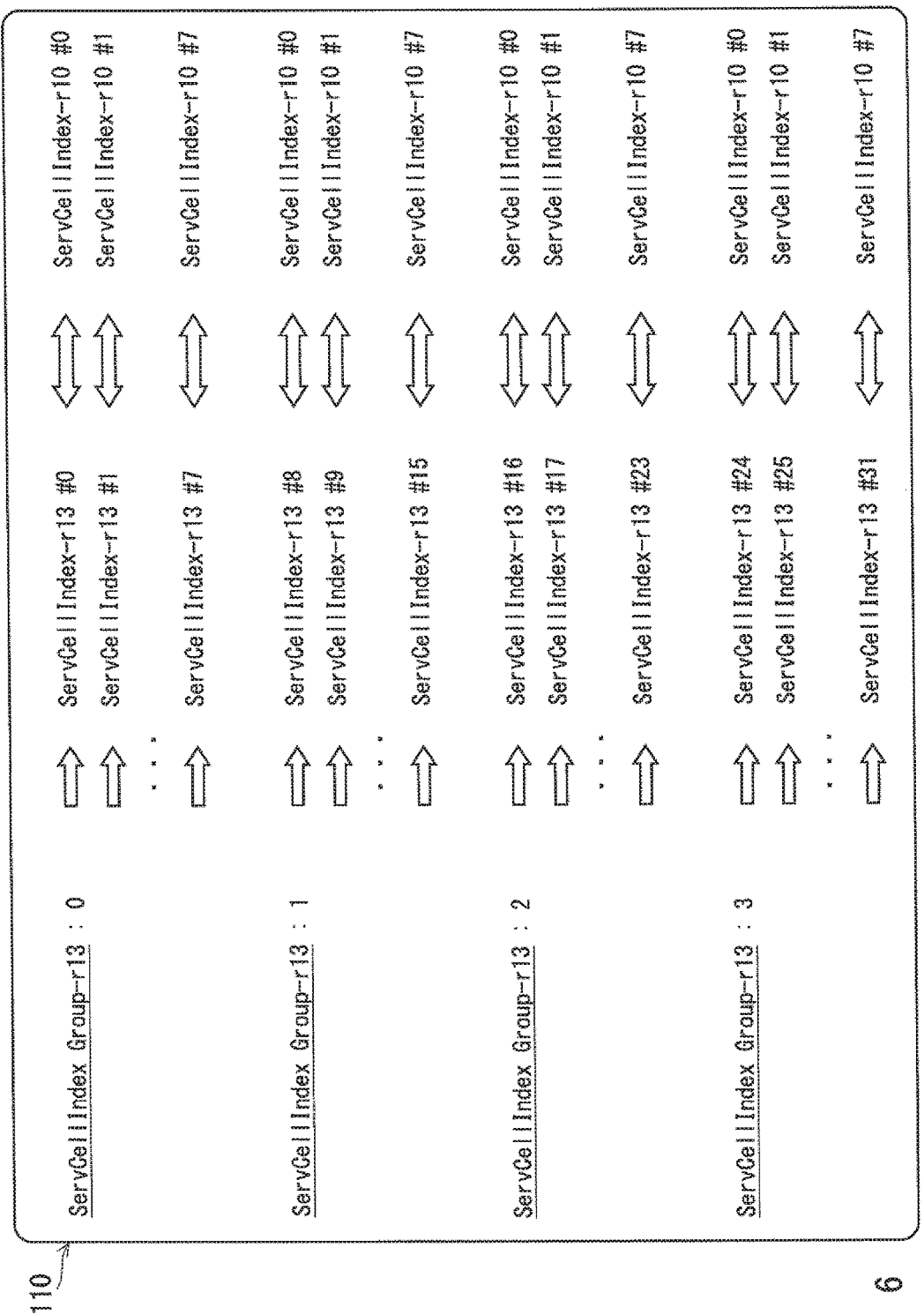
FIG. 6 illustrates Exemplary grouping of servicing carrier components.

Referring to FIG. 5, an aspect of the present proposal (the $1^{st}$ aspect) involves the introduction of a 5-bit Radio Resource Control (RRC) parameter for identifying a Rel'13 servicing-cell or CC (i.e. the PCell/PCC or an SCell/SCC) named "ServCellIndex-r13" and associated mapping (100) for identifying and handling up to 32 configured CCs at the eNB and UE. The proposed 5-bit ServCellIndex-r13 (102) is further divided into 4 Rel'13 servicing-cell-index groups named as "ServCellIndex Group-r13" (103) where each "ServCellIndex Group-r13" has at most 8 CCs and is identified with a Rel'10 service-cell-index named "ServCellIndex-r10" (104). Either the 2 most-significant bits or the 2 least-significant bits in the 5-bit string are used for identifying group indexes (0, 1, 2, or 3) and the remaining 3-bits are used for identifying the Rel'10 serving cell indexes within a group (i.e. 0, 1, 2, 3, 4, 5, 6, or 7). The proposed mapping of the 5-bit ServCellIndex-r13 into the 2-bit "ServCellIndex Group-r13" and the 3-bit "ServCellIndex-r10" is further illustrated in FIG. 6.

Referring to FIG. 7, another aspect of the present proposal (the $2^{nd}$ aspect) relates to the "ServCellIndex Group-r13" definition (200) and associated UE specific search space (USS) configuration.

A configured "ServCellIndex Group-r13" is identified as a "self-scheduling" group (210) when all CCs in its group are configured as self-scheduling CC (211). Each self-scheduling CC further comprises a UE Specific Search Space (USS) (213) within its control region (212) providing scheduling information for the reception of scheduled PDSCH in the data region (214).

A configured "ServCellIndex Group-r13" is identified as a "Cross-scheduling" group (230) when at most one CC in its group is configured as a cross-carrier scheduling CC (231) to provide scheduling information for the reception of scheduled PDSCHs on its own DL CC (231) and other DL CC(s) (240) in its group. The cross-carrier scheduling CC (231) may be further configured to provide scheduling information for the reception of scheduled PDSCH on the DL CCs (255$s$) in other groups (250). According to the present proposal, within the control region (232) on the cross-carrier scheduling CC (231), the USS(s) configured for transmitting another group's CCs scheduling information (234) must not overlap with the USS(s) configured for transmitting its own group's CCs scheduling information (233). In a "Cross-scheduling" group (230), there may be one or more CCs that can be configured as self-scheduling CCs (245).

A configured "ServCellIndex Group-r13" is identified as a "Cross-scheduled" group (250) when it does not have a "scheduling CC" and one or more CCs (255) in its group are cross-scheduled by a scheduling CC (231) in another group (230). In a "Cross-scheduled" group (250), there may be one or more CCs that can be configured as self-scheduling CCs (256).

Figure 8A:
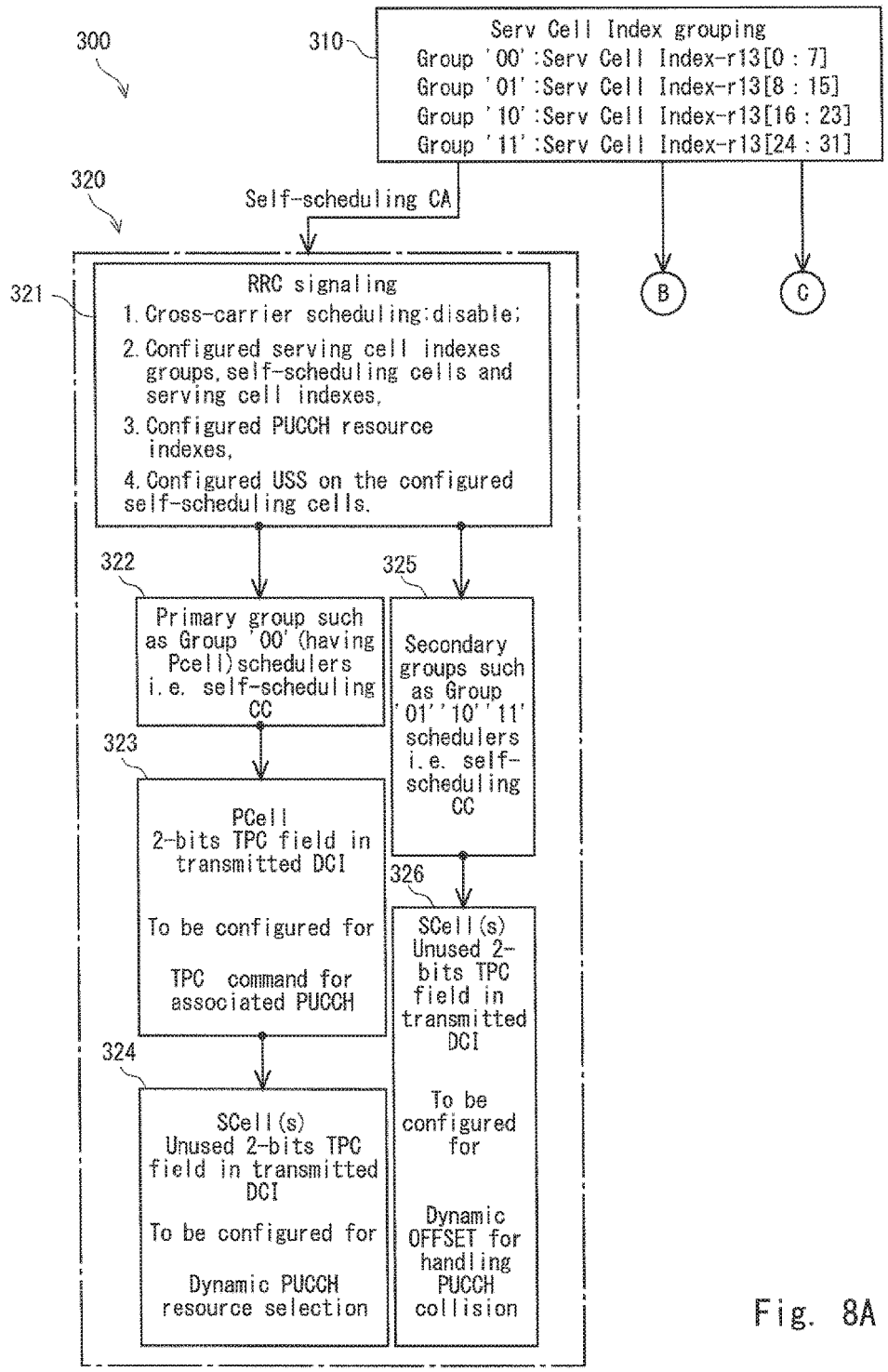
FIG. 8A illustrates eNodeB Procedure for self-scheduling, cross-carrier scheduling, and hybrid scheduling CA operation.
Figure 8B:
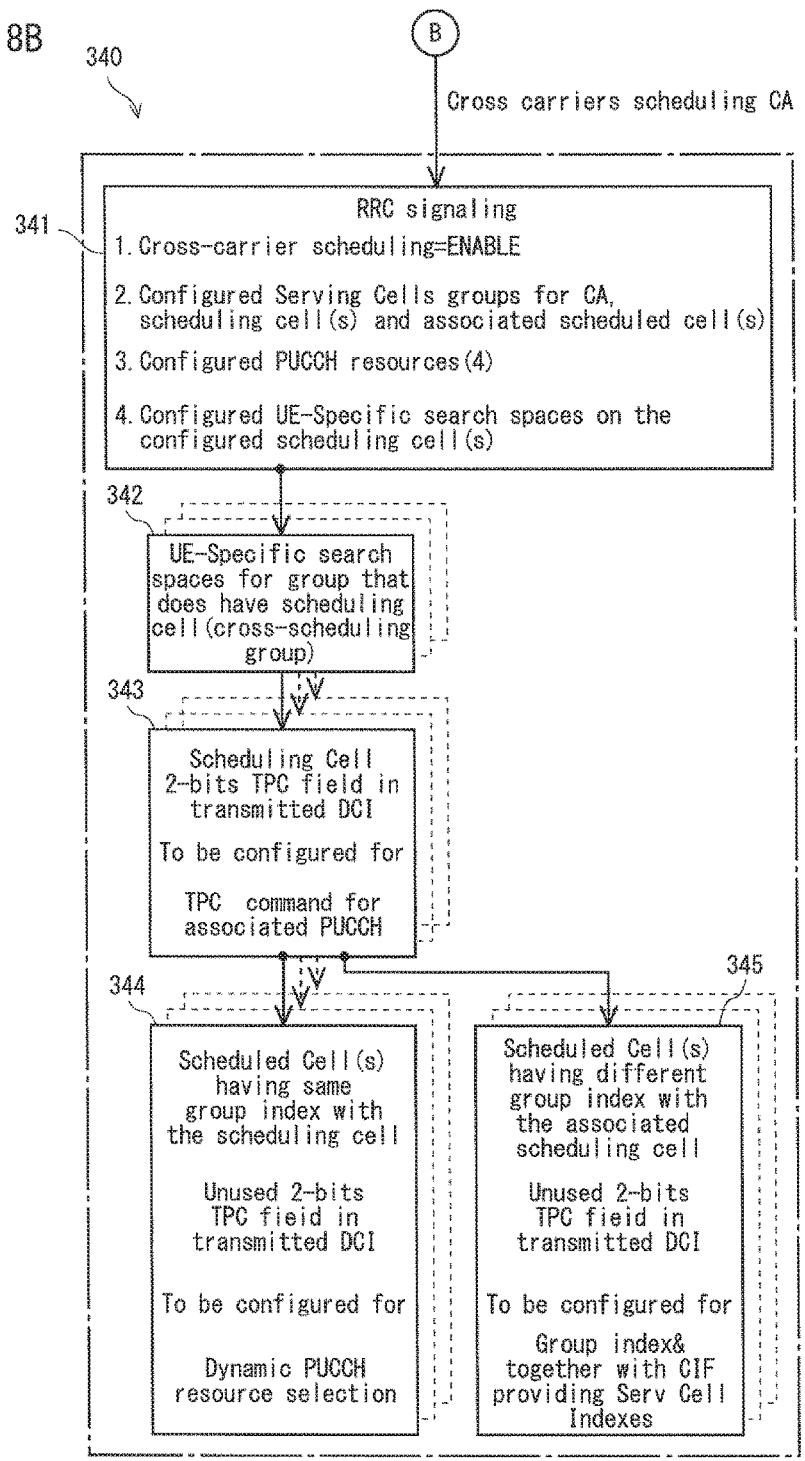
FIG. 8B illustrates eNodeB Procedure for self-scheduling, cross-carrier scheduling, and hybrid scheduling CA operation.
Figure 8C:
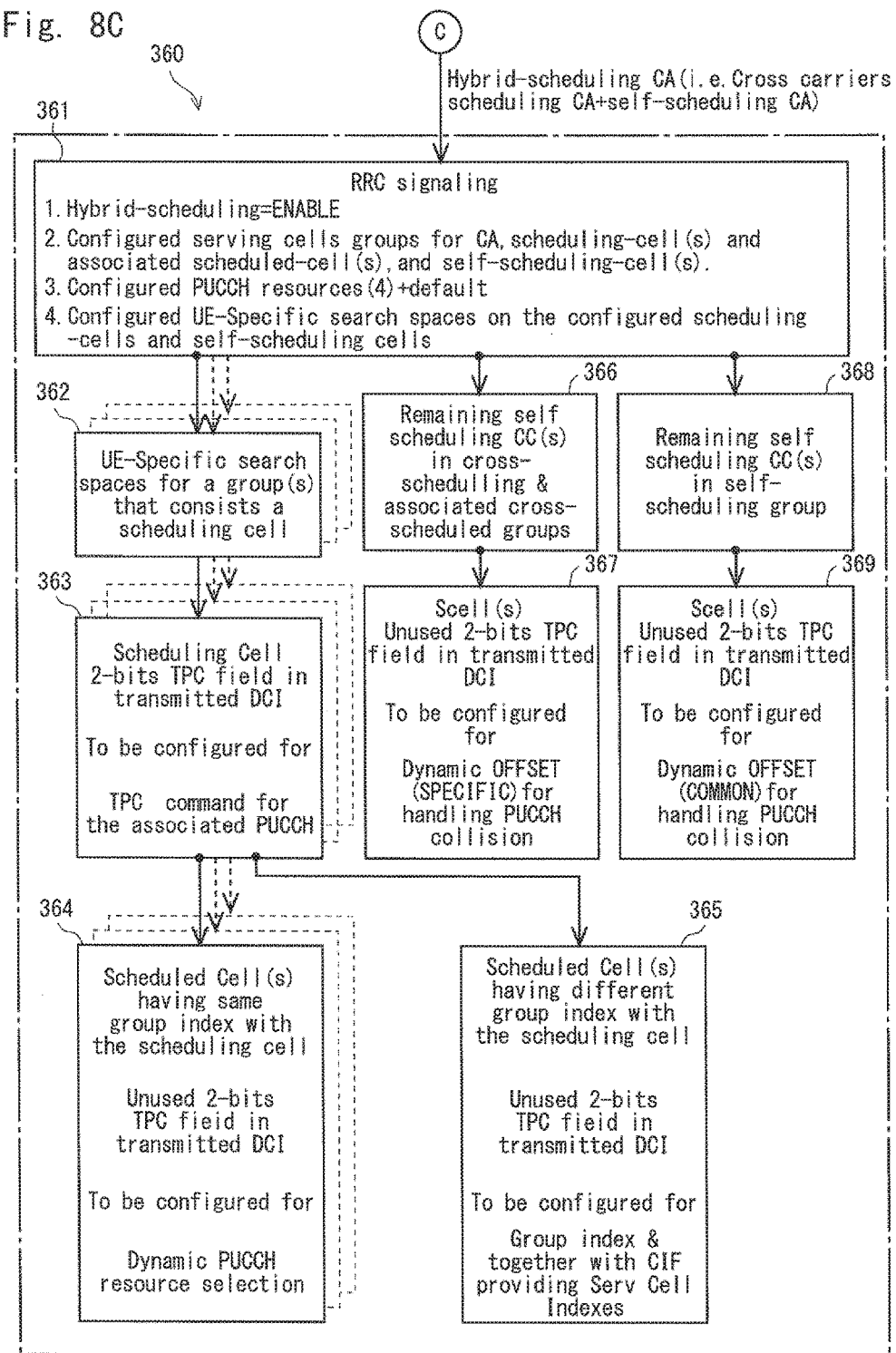
FIG. 8C illustrates eNodeB Procedure for self-scheduling, cross-carrier scheduling, and hybrid scheduling CA operation.
Figure 9:
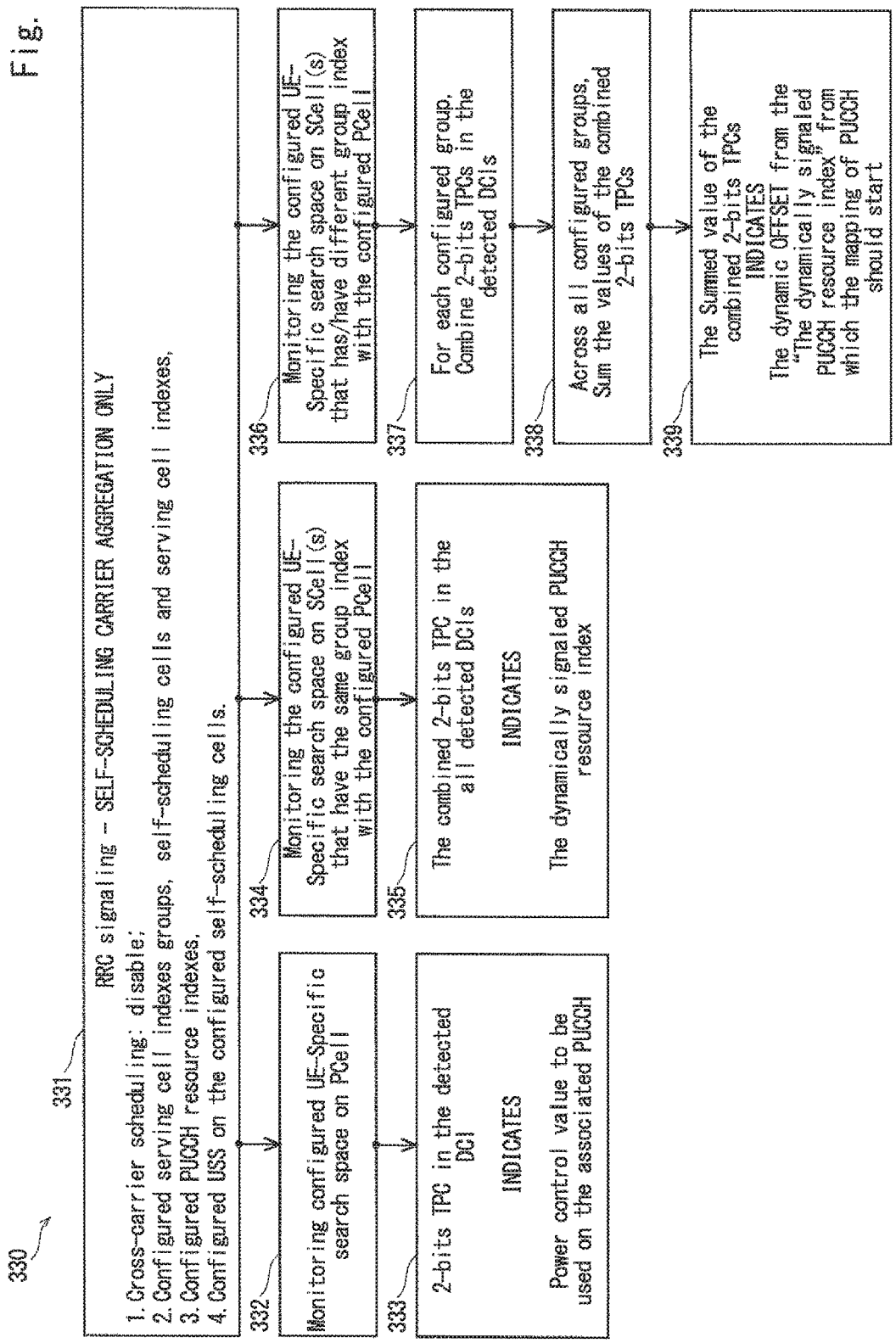
FIG. 9 illustrates UE procedure—Self-scheduling CA operation.
Figure 11:
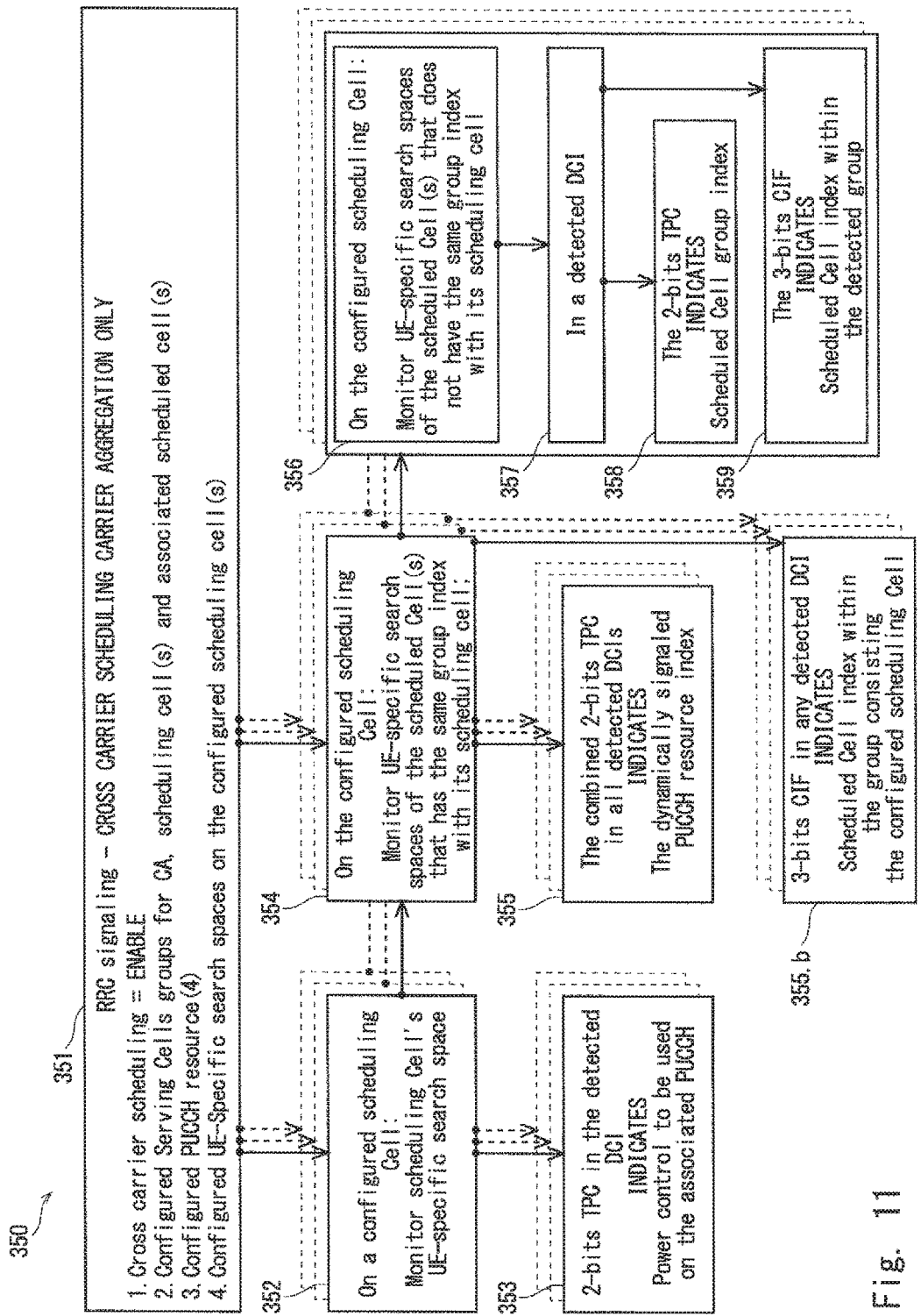
FIG. 11 illustrates UE procedure—Cross Carrier scheduling CA operation.
Figure 13:
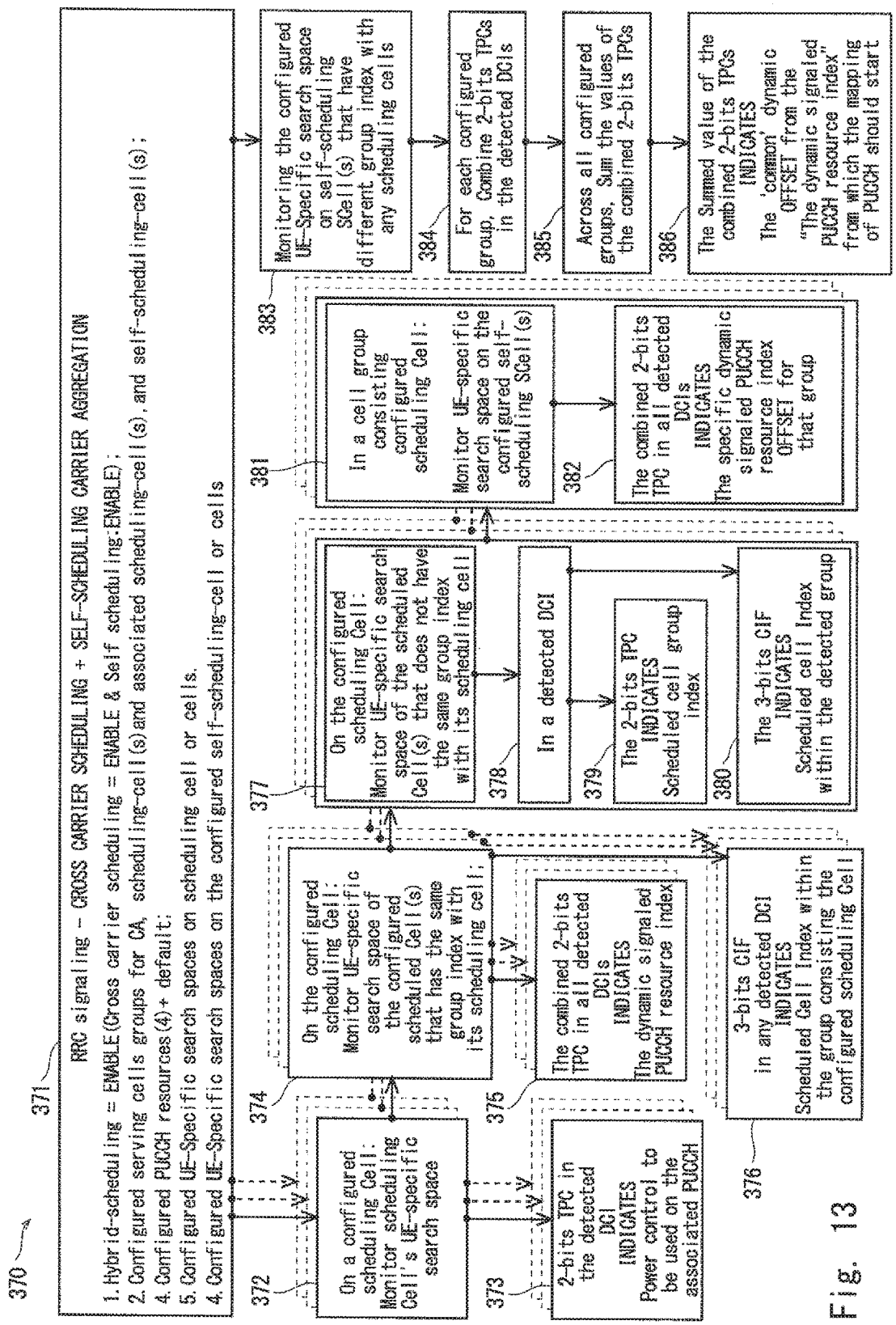
FIG. 13 illustrates UE procedure—Hybrid scheduling CA operation.

A particularly important (implementational) aspect of the present proposal (the $3^{rd}$ aspect) involves:

a method (300), depicted in FIGS. 8A to 8C, for use in an advanced eNB; and associated methods, namely the method (330) depicted in FIG. 9, the method (350) depicted in FIG. 11 and the method (370) depicted in FIG. 13, these being methods for use in advanced UEs for realising DL carrier aggregation on up to 32 DL CCs with no UL CA and associated feedbacks.

With reference to FIG. 8A, regardless of the configured CA configuration, the method to be used in an advanced eNB (300) always starts with ServCellIndex Grouping (310) as discussed above and referred to as the 1st aspect.

(1) Rel'13 UE in an Environment Only Suitable for a Self-Scheduling CA Configuration For a Rel'13 UE in an environment that is only suitable for a self-scheduling CA configuration (i.e. no-cross-carrier scheduling), a procedure (320) is applied at the eNB where, through the existing RRC connection or newly established RRC connection, the eNB uses RRC-signalling to configure a Rel'13 UE for no-cross-carrier scheduling CA operation. The RRC-Signalling (321) includes (but is not necessarily limited to) the following:

a. Cross-carrier scheduling: disable;

b. Configure serving cell index groups, self-scheduling cells and serving cell indexes;

c. Configure a set of 4 independent PUCCH resource indexes (selected in the range [0:549] where the $1^{st}$ PUCCH resource or any pre-defined PUCCH resource in the set is configured as the default PUCCH resource index);

d. Configure USS on the configured self-scheduling cells.

In the ServCellIndex Group-r13 that has PCell (i.e. primary group) (322), on a subframe that the PCell schedules for DL data reception at the Rel'13 UE, the PCell's scheduler uses 2-bits of the TPC field in the transmitted DCI to inform the Rel'13 UE of the power control command to be used on the associated PUCCH that carries UE feedback (323). Furthermore, on a subframe that the SCell schedules for DL data reception at the Rel'13 UE, the SCell's scheduler uses 2 unused bits of the TPC field in the transmitted DCI to inform the Rel'13 UE of the PUCCH resource index for mapping the associated PUCCH that carries UE feedback (324). The Rel'13 UE may assume that the same TPC value is transmitted on all scheduled SCells in the primary group.

Depending on the number of configured servicing cells for CA, a Rel'13 PUCCH carrying UE feedback may span multiple UL PRBs (Physical Resource Blocks). This may increase collision (or possible collision) with other UE's PUCCH transmissions that share the same PUCCH resource index set. According to the present proposal, in order to increase flexibility at the eNB in handling PUCCH collision, in the configured ServCellIndex Group-r13 that does not have PCell (i.e. secondary group) (325), on a subframe that the SCell schedules for DL data reception at the Rel'13 UE, the SCell's schedulers use 2 unused bits of the TPC field in the transmitted DCI to inform the Rel'13 UE of the PUCCH resource index offset to be used on the associated PUCCH that carries UE feedback (326). The Rel'13 UE may assume that the same TPC value is transmitted on all scheduled SCells in a secondary group. The Rel'13 UE may also assume that the soft-combined or selective-combined TPC value from each secondary group can be summed to give the final PUCCH resource index offset in the range [0:11].

Corresponding to the eNB's method (320) discussed above with reference to FIG. 8A, which applies to a no-cross-carrier scheduling CA configuration (i.e. a self-scheduling CA configuration), there is a UE method (330) illustrated in FIG. 9. The UE method (330) starts with RRC-Signaling (331) configured by the servicing eNB. The configured RRC-signalling includes (but is not necessarily limited to) the following:
 a. Cross-carrier scheduling: disable;
 b. Configure serving cell index groups, self-scheduling cells and serving cell indexes;
 c. Configure a set of 4 independent PUCCH resource indexes (selected in the range [0:549] where the $1^{st}$ PUCCH resource or any pre-defined PUCCH resource in the set is the default PUCCH resource index);
 d. Configure USS on the configured self-scheduling cells.

On a DL subframe basis, the UE monitors the configured USS on the PCell (332) for the intended DCI. The 2-bits of the TPC on the detected DCI provides the UE with the power command (333) to be used in transmitting PUCCH carrying UE feedbacks on the associated UL subframe.

Simultaneously, the UE also monitors the configured USSs on SCells (up-to 7 SCells) in the group (primary self-scheduling group) that has the PCell (334) for intended DCI(s). The soft-combined or selective-combined 2-bits of the TPC on the detected DCI provide the UE with the dynamically configured PUCCH resource index (335) to be used on the associated UL subframe.

Furthermore, the UE also concurrently monitors the configured USSs on SCells (up-to 8 SCells) in the configured group (secondary self-scheduling groups) that does not have the PCell (336) for intended DCI(s). There may be up-to 3 secondary self-scheduling groups, and the soft-combined or selective-combined 2-bits of the TPC on the detected DCIs in each configured self-scheduling group (337) can be summed (338) to provide the UE with the dynamically configured PUCCH resource index offset (339) to be used on the associated UL subframe. Depending on the number of configured servicing cells (CCs) in CA, the UE may use one or an integer number of consecutive time-frequency PUCCH resource indexes for the mapping of PUCCH carrying UE feedback. The starting PUCCH resource index is identified by the detected PUCCH resource index (335) and detected PUCCH resource index offset (339).

Figure 10:
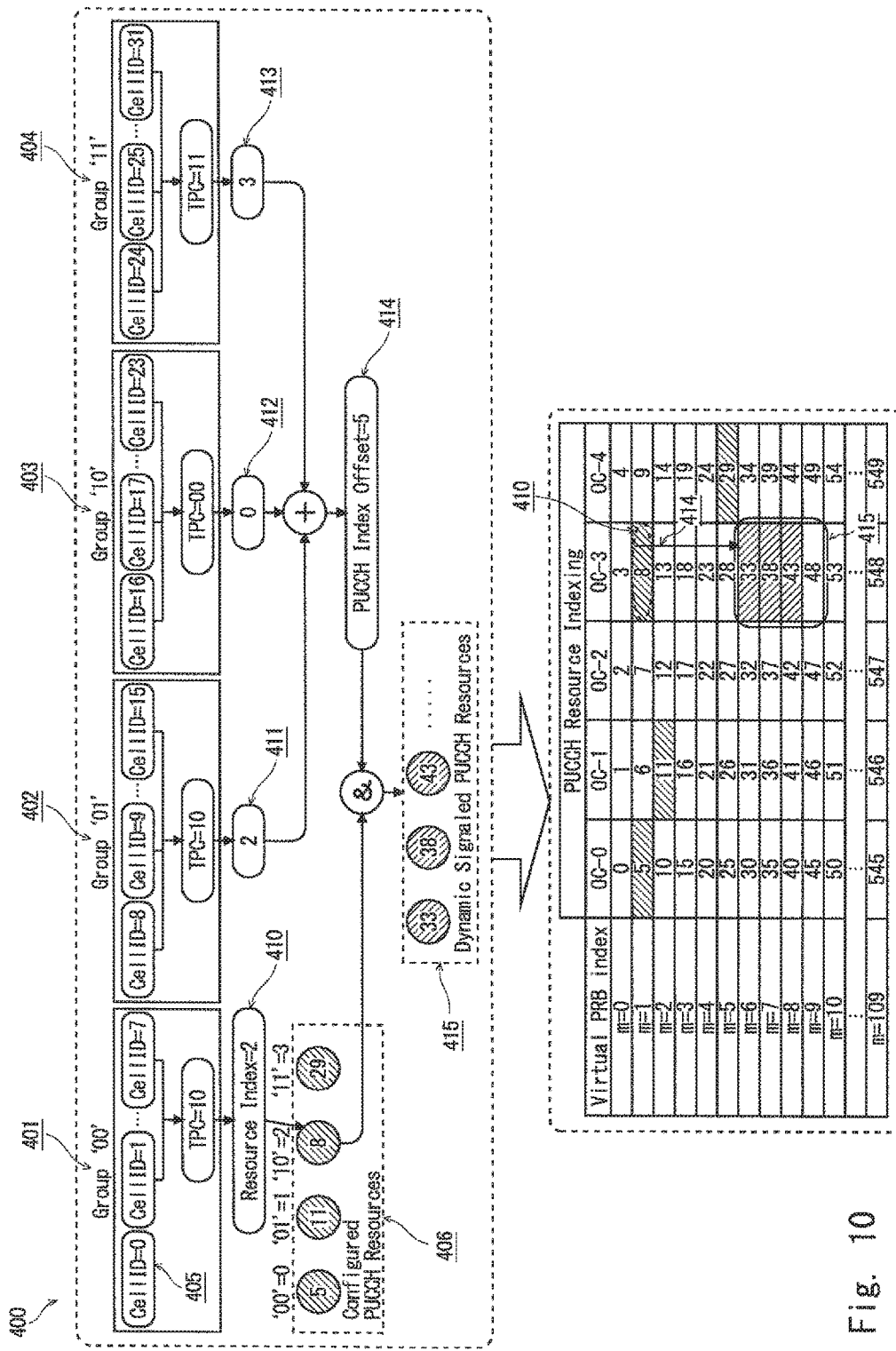
FIG. 10 illustrates Example of dynamic PUCCH resource allocation in self-scheduling CA operation.

The concept of PUCCH index configuration and dynamic signalling is further illustrated by an example shown in FIG. 10. Via RRC-signalling, the eNB configures a Rel'13 UE with 32 servicing cells [0 . . . 31] that are grouped into 4 groups [0, 1, 2, 3] or [00, 01, 10, 11] (401, 402, 403, and 404). The group '00' (401) has the PCell (405) and is therefore the so called primary self-scheduling group. The eNB also configures the Rel'13 UE with the set of 4 PUCCH resource indexes [5, 11, 8, and 29] (406). On a particular DL subframe, the soft-combined or selective-combined 2-bits of the TPC on the detected DCIs in the primary self-scheduling group '00' (401) may give value of ('10'=2) (410) indicating the dynamically configured PUCCH resource index='8'. Concurrently, on the same DL subframe, the soft-combined or selective-combined 2-bits of the TPC on the detected DCIs in secondary self-scheduling groups '01' (402), '10' (403), '11' (404), may give values of ('10'=2) (411), ('00'=0) (412), and ('11'=3) (413) respectively, and the sum of those combined 2-bits of the TPC value provides the UE the dynamically configured PUCCH resource index offset of (2+0+3=5) (414). By using the dynamically configured PUCCH resource index value of 8 (410) and the dynamically configured PUCCH resource index offset of 5 (414), the UE may select the consecutive PUCCH resource indexes [33, 38, 43, 48 . . . ] (415) in time-frequency for the mapping of the associated PUCCH carrying UE feedback.

(2) Rel'13 UE in an Environment Only Suitable for a Cross-Carrier Scheduling CA Configuration For a Rel'13 UE in an environment that is only suitable for a cross-carrier scheduling CA configuration, the procedure (340) depicted in FIG. 8B is applied at the eNB. Through the existing RRC connection or a newly established RRC connection, the eNB uses RRC-signalling to configure a given Rel'13 UE for cross-carrier scheduling CA operation. The RRC-Signalling (341) includes (but is not necessarily limited to) the following:
 a. Cross-carrier scheduling: enable;
 b. Configure serving cell index groups, scheduling cells and associated scheduled cells;
 c. Configure a set of 4 independent PUCCH resource indexes (selected in the range [0:549] where the $1^{st}$ PUCCH resource and/or any pre-defined PUCCH resource in the set is configured as the default PUCCH resource indexes);
 d. Configure USS on the configured scheduling cells with the restriction that USSs for DL CCs within the cross-scheduling group should not overlap with USSs for DL CCs in other cross-scheduled groups (see the "cross-scheduling group" and "cross-scheduled group" which are discussed above as the so called $2^{nd}$ aspect).

In a configured cross-scheduling group (there may be up-to 4 cross-scheduling groups) and on the scheduling cell, on a subframe that the scheduling-cell schedules for DL data reception on scheduling cell at the Rel'13 UE, the scheduling cell's scheduler uses 2-bits of the TPC field in the transmitted DCI to inform the Rel'13 UE of the power control command to be used on the associated PUCCH that carries UE feedback (343). Furthermore, on a subframe that the scheduling-cell schedules for DL data reception on the scheduled-cells at the Rel'13 UE, the scheduling cell's scheduler uses 2 unused bits of the TPC field in the transmitted DCI to inform the Rel'13 UE of the PUCCH resource index to be used on the associated PUCCH that carries UE feedback (344). The Rel'13 UE may assume that the same TPC value is transmitted for all scheduled-cells in the cross-scheduling group. Additionally, the scheduling cell in a cross-scheduling group may be configured to provide scheduling information for the reception of DL data on scheduled cells in other cross-scheduled groups (there may be up-to 3 configured cross-scheduled groups and each scheduled group may have up-to 8 configured scheduled cells). On a subframe that the scheduling-cell schedules for DL data reception on scheduled-cells in a cross-scheduled group at the Rel'13 UE, the scheduling cell's scheduler uses 2-bits of the TPC field in the transmitted DCI to inform the Rel'13 UE of the cross-scheduled group number and the corresponding Carrier Indicator Filed (CIF) is used to indicate the scheduled cell in the identified cross-scheduled group (345). In cases where more than one scheduling groups (i.e. 2, 3, or 4) are configured, the eNB may configure different dynamic PUCCH resources and different power control commands to be used for the transmission of PUCCHs.

Corresponding to the eNB's method (340) discussed above with reference to FIG. 8B, which applies to a cross-carrier scheduling CA configuration, there is a UE method (350) illustrated in FIG. 11. The UE method (350) starts with RRC-Signalling (351) configured by the servicing eNB. The configured RRC-signalling includes (but is not necessarily limited to) the following:

a. Cross-carrier scheduling: enable;
b. Configure serving cell index groups, scheduling cells and associated scheduled cells;
c. Configure a set of 4 independent PUCCH resource indexes (selected in the range [0:549] where the 1st PUCCH resource or any pre-defined PUCCH resource in the set is the default PUCCH resource index);
d. Configure USS on the configured scheduling cells for scheduled cells in the cross-scheduling group and/or scheduled cells in the cross-scheduled groups.

On DL subframe basis, the UE monitors the configured USS on a scheduling cell (352) for intended scheduling-cell DCI. The 2-bits of the TPC on the detected DCI for the scheduling cell provides the UE with the power control command to be used in transmitting PUCCH (353) carrying feedback on the associated UL subframe. Simultaneously, the UE also monitors the configured USS on the scheduling cell for intended scheduled-cell's DCI within its cross-scheduling group (354). The soft-combined or selective-combined 2-bits of the TPC on the detected DCI for the scheduled cells provides the UE with the dynamically configured PUCCH resource index for mapping the PUCCH(s) on the associated UL subframe (355). The 3-bit CIF on the detected DCI indicates the targeted scheduled-cell in the said cross-scheduling group (355.b). Furthermore, when being configured with one or more cross-scheduled group(s) and belonging scheduled cell(s), the UE further monitors the configured USSs on the scheduling cell for intended scheduled-cell's DCI within the configured cross-scheduled group (356). The 2 unused bits of the TPC in the detected DCI (357) indicate the cross-scheduled group index (358) and the associated 3-bit CIF on the same DCI indicates the scheduled-cell index (359).

Figure 12:
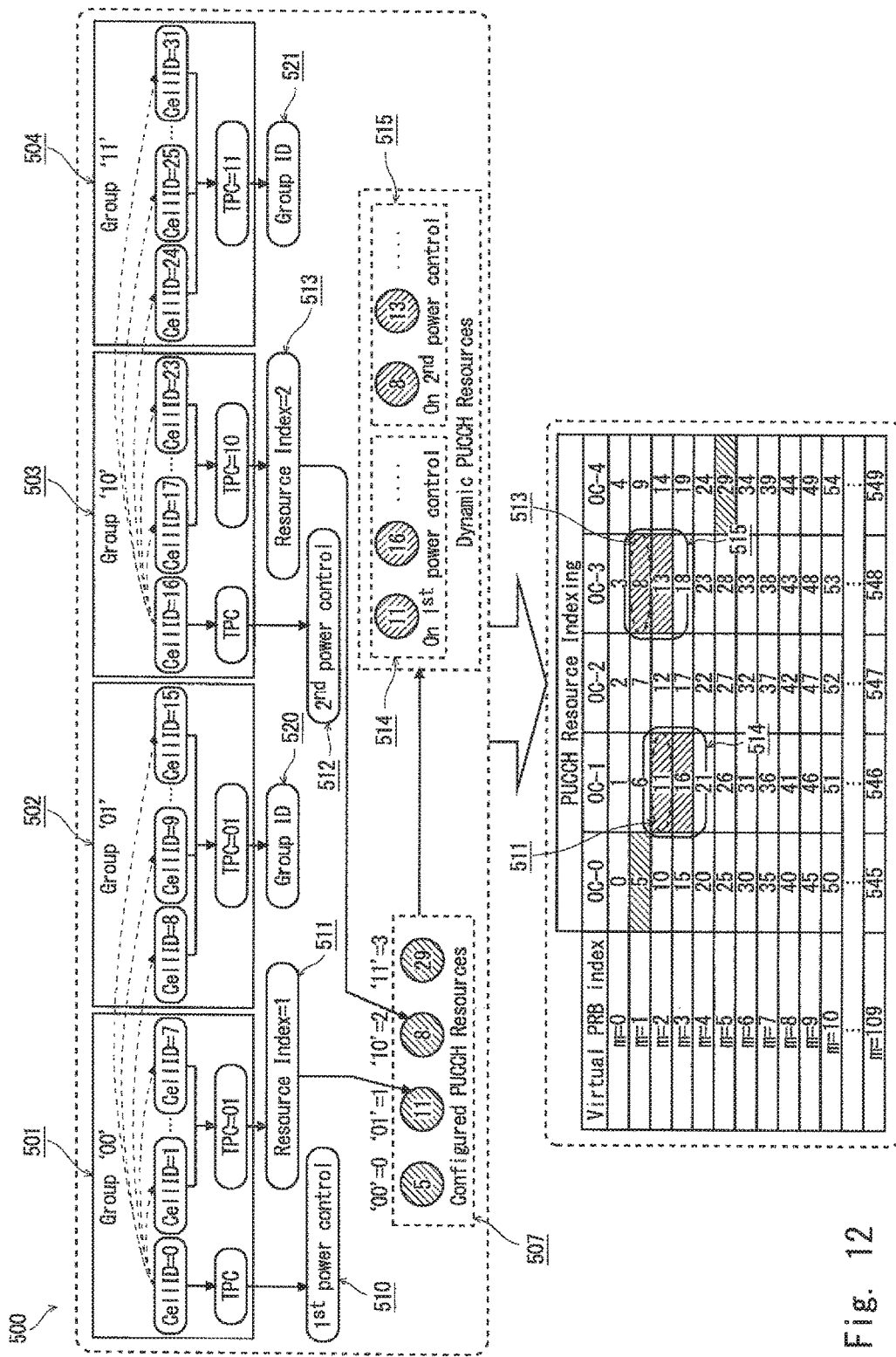
FIG. 12 illustrates Example of dynamic PUCCH resource allocation in cross-carrier scheduling CA operation.

The concept of PUCCH index configuration and dynamic signalling in cross-carrier scheduling CA configuration is further illustrated by an example (500) shown FIG. 12. Via RRC-signalling, the eNB configures a Rel'13 UE with 32 servicing cells [0 . . . 31] that are grouped into 4 groups [00, 01, 10, 11] ((501), (502), (503), (504)). In FIG. 12, group '00' (501) and group '10' (503) are further configured as cross-scheduling groups having $1^{st}$ and $2^{nd}$ scheduling-cells (505) and (506) respectively. The $1^{st}$ scheduling cell (505) is configured to transmit DCIs providing scheduling information for the reception of DL data on its scheduling-cell (505), and DL data on the scheduled-cells within its cross-scheduling group (501). The $1^{st}$ scheduling cell (505) is further configured to provide scheduling information for the reception of DL data on the scheduled-cells in the cross-scheduled group '01' (502). Similarly, the $2^{nd}$ scheduling cell (506) is configured to transmit DCI providing scheduling information for the reception of DL data on its scheduling-cell (506) and DL data on the scheduled-cells within its cross-scheduling group (503). The $2^{nd}$ scheduling cell (506) is further configured to provide scheduling information for the reception of DL data on the scheduled-cells in the cross-scheduled group '11' (504). The eNB also configures the Rel'13 UE with the set of 4 PUCCH resource indexes [5, 11, 8, and 29] (507).

On a particular DL subframe, the 2-bits of the TPC on the detected DCI intended for DL data reception on the scheduling-cells (505 and 506) provide the 1st power control (510) and 2nd power control (512) to be used on the associated PUCCHs. The 2-bits of the TPC on the detected DCIs intended for DL data reception on the scheduled-cells within a configured cross-scheduled group provide cross-scheduled group index (520 and 521). In FIG. 12, the (soft or selective) combined 2-bits of the TPC on the detected DCIs for scheduled-cells within the configured cross-scheduling groups (501 and 503) give values of '01'=1 (511) and '10'=2 (513) indicating the dynamically configured PUCCH resource indexes='11' and '8' respectively. By using the dynamically configured PUCCH resource index value of 11 (511) & 8 (513), the UE selects the consecutive PUCCH resource indexes [11, 16 . . . ] (514) and [8, 13 . . . ] (515) in time-frequency for the mapping of the associated PUCCHs carrying UE feedback. The PUCCHs mapped on PUCCH resource indexes [11, 16 . . . ] (514) and [8, 13 . . . ] (515) may be further configured to have different transmit-power levels that follow the 1st power control command and 2nd power control command allowing for multiple PUCCHs mapping and transmission.

(3) Rel'13 UE in an Environment Suitable for Hybrid-CA Configuration

For a Rel'13 UE in an environment that is suitable for hybrid-CA configuration (i.e. a combination of cross-carrier scheduling and self-scheduling), the procedure (360) depicted in FIG. 8C is applied at the eNB. Through the existing RRC connection or a newly established RRC connection, the eNB uses RRC-signalling to configure a Rel'13 UE for hybrid-scheduling CA operation. The RRC-Signalling (361) includes (but is not necessarily limited to) the following:

a. Hybrid-scheduling: enable (i.e. cross-carrier scheduling: enable & self-scheduling: enable);
b. Configure serving cell index groups, scheduling cell(s) and associated scheduled cell(s), self-scheduling cell(s);
c. Configure a set of 4 independent PUCCH resource indexes (selected in the range [0:549] where the $1^{st}$ PUCCH resource and/or any pre-defined PUCCH resource in the set is configured as the default PUCCH resource indexes);
d. Configure USS on the configured scheduling cells with the restriction that USSs for DL CCs within the cross-scheduling group should not overlap with USSs for DL CCs in other cross-scheduled groups (see the "cross-scheduling group", "cross-scheduled group" and "self-scheduling group" which are discussed above as the so called 2nd aspect);
e. Configure USS on the self-scheduling cells.

In a configured cross-scheduling group (there may be up to 4 configured cross-scheduling groups) and on the scheduling cell (362), on a subframe that the scheduling-cell schedules for DL data reception on the scheduling cell at the Rel'13 UE, the scheduling cell's scheduler uses 2-bits of the TPC field in the transmitted DCI to inform the Rel'13 UE of the power control command to be used on the associated PUCCH that carries UE feedback (363). Furthermore, on a subframe that the scheduling-cell schedules for DL data reception on the scheduled-cells within its scheduling-group at the Rel'13 UE, the scheduling cell's scheduler uses 2 unused bits of the TPC field in the transmitted DCIs to inform the Rel'13 UE of the PUCCH resource index to be used on the associated PUCCH that carries UE feedback (364). The Rel'13 UE may assume that the same TPC value is transmitted for all scheduled-cells in the cross-scheduling group. Additionally, the scheduling-cell in a cross-scheduling group may be configured to provide scheduling information for the reception of DL data on scheduled-cells in the configured cross-scheduled groups (there may be up-to 3 configured cross-scheduled groups and each may have up-to 8 configured scheduled cells). On a subframe that the scheduling-cell schedules for DL data reception on scheduled-cells in a cross-scheduled group at the Rel'13 UE, the scheduling-cell's scheduler uses 2-bits of the TPC field in the transmitted DCI to inform the Rel'13 UE of the cross-scheduled group number and the corresponding CIF is used to indicate the scheduled cell in the identified cross-scheduled group (365). In cases where more than one scheduling group (i.e. 2, 3, or 4) is configured, the eNB may configure different dynamic PUCCH resources and different power control commands to be used for the transmission of PUCCHs.

In a hybrid-scheduling CA configuration, within a cross-scheduling group and/or cross-scheduled group, the eNB may configure one or more cells as self-scheduling cells (366). On a subframe that a self-scheduling cell schedules for DL data reception at the Rel'13 UE, the self-scheduling cell's scheduler may use 2 unused bits of the TPC field in the transmitted DCI to inform the Rel'13 UE of the specific PUCCH resource index offset to be used on the transmitted PUCCH resource index in the cross-scheduling group (367). The Rel'13 UE may assume that the same TPC value is used on all self-scheduling cells in a cross-scheduling/cross-scheduled group. The Rel'13 UE may further assume that the (soft or selective) combined TPC value from the cross-scheduling group and associated cross-scheduled group can be summed to give the final specific PUCCH resource index offset in the range [0:15] to be used on the transmitted PUCCH resource index in the cross-scheduling group.

Furthermore, in a hybrid-scheduling CA configuration, the eNB may configure one or more groups (i.e. ServCellIndex Group-r13) as self-scheduling group(s) (368) (there may be up-to 3 configured self-scheduling groups). On a subframe that a self-scheduling cell schedules for DL data reception at the Rel'13 UE, the self-scheduling cell's scheduler may use 2 unused bits of the TPC field in the transmitted DCI to inform the Rel'13 UE of the common PUCCH resource index offset to be used on all transmitted PUCCH resource indexes (369). The Rel'13 UE may assume that the same TPC value is used on all self-scheduling cells in a self-scheduling group. The Rel'13 UE may further assume that the (soft or selective) combined TPC value from all configured self-scheduling groups can be summed to give the final common PUCCH resource index offset in the range [0:11] to be used on all transmitted PUCCH resource index in addition to the detected specific PUCCH resource index offset.

Corresponding to the eNB's method (360) discussed above with reference to FIG. 8C, which applies to a hybrid-scheduling CA configuration, there is a UE method (370) illustrated in FIG. 13. The UE method (370) starts with RRC-Signalling (371) configured by the servicing eNB. The configured RRC-signalling includes (but is not necessarily limited to) the following:

a. Hybrid-scheduling: enable (i.e. cross-carrier scheduling: enable & self-scheduling: enable);
  b. Configure serving cell index groups, scheduling cell(s) and associated scheduled cell(s), and self-scheduling cell(s);
  c. Configure a set of 4 independent PUCCH resource indexes (selected in the range [0:549] where the $1^{st}$ PUCCH resource and/or any pre-defined PUCCH resource in the set is configured as the default PUCCH resource indexes);
  d. Configure USS on the configured scheduling cell(s) with the restriction that USSs for DL CCs within the cross-scheduling group should not overlap with USSs for DL CCs in other cross-scheduled groups;
  e. Configure USS on the configured self-scheduling cell (s).

On a DL subframe basis, the UE monitors the configured USS on a scheduling cell (372) for intended scheduling-cell DCI. The 2-bits of the TPC on the detected DCI for the scheduling cell provides the UE with the power control command to be used on transmitting PUCCH (373) carrying feedback on the associated UL subframe. Simultaneously, the UE also monitors the configured USS on the scheduling cell for intended scheduled-cell's DCI within its cross-scheduling group (374). The soft-combined or selective-combined 2-bits of the TPC on the detected DCIs for the scheduled cells provides the UE with the dynamically configured PUCCH resource index for mapping the PUCCH(s) on the associated UL subframe (375). The 3-bit CIF on the detected DCI indicates the targeted scheduled-cell in the said cross-scheduling group (376). Furthermore, when being configured with one or more cross-scheduled group(s) belonging to scheduled cell(s), the UE further monitors the configured USSs on the scheduling cell for intended scheduled-cell's DCI within the configured cross-scheduled group (377). The 2 unused bits of the TPC in the detected DCI (378) indicates the cross-scheduled group index (379) and the associated 3-bit CIF on the same DCI indicates the scheduled-cell index (380) within the group.

In the hybrid-scheduling CA configuration, the Rel'13 UE is configured with one or more self-scheduling cell(s). Any self-scheduling cell(s) may be configured in a cross-scheduling group(s) and/or in associated cross-scheduled group (s), or in self-scheduling group(s). On a configured self-scheduling cell in a cross-scheduling and/or associated cross-scheduled group, the UE further monitors the configured USS for intended DCI (381). The soft-combined or selective-combined 2-bits of the TPC on the detected DCIs in the cross-scheduling group and the associated cross-scheduled groups can be summed to provide the UE with the final specific PUCCH resource index offset (382) to be used on the associating PUCCH resource index detected in (375). On a configured self-scheduling cell in a self-scheduling a group, the UE further monitors the configured USS for intended DCI (383). The soft-combined or selective-combined 2-bits of the TPC on the detected DCIs in the self-scheduling group (384) can be summed with the one in the other configured self-scheduling groups (385) to provide the UE with the final common PUCCH resource index offset (386) to be used on all detected PUCCH resource index(es) in addition to the detected specific PUCCH resource index offset(s) (382).

Figure 14:
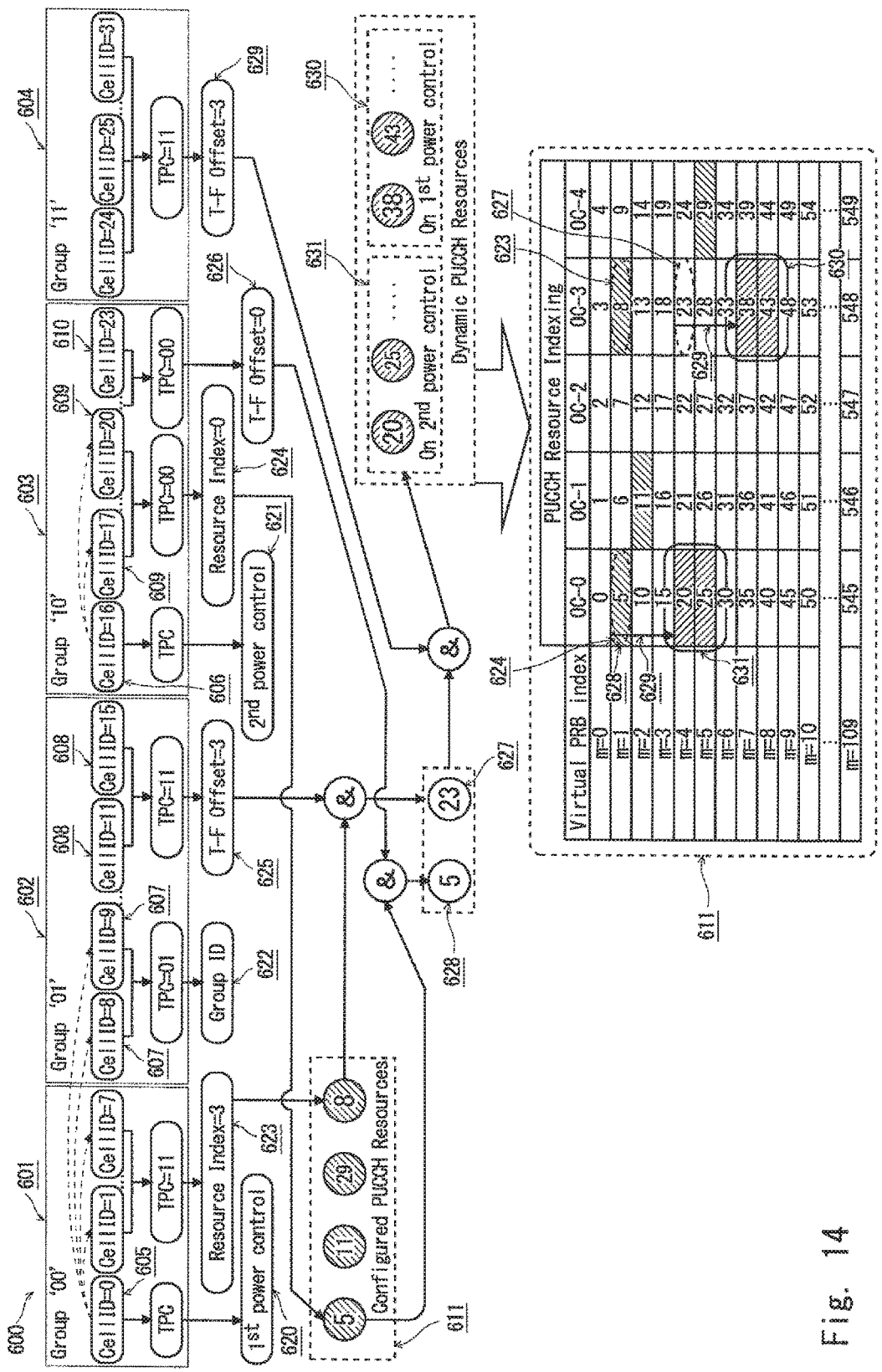
FIG. 14 illustrates Example of dynamic PUCCH resource allocation in hybrid-scheduling CA operation.

The concept of PUCCH index configuration and dynamic signalling in a hybrid-scheduling CA configuration is further illustrated by an example (600) shown in FIG. 14. Via RRC-signalling, the eNB configures a Rel'13 UE with 32 servicing cells [0 . . . 31] that are grouped into 4 groups [00, 01, 10, 11] ((601), (602), (603), (604)). In FIG. 14, group '00' (601) and group '10' (603) are further configured as cross-scheduling groups having 1st and 2nd scheduling-cells (605) and (606) respectively. The 1st scheduling cell (605) is configured to transmit DCIs providing scheduling information for the reception of DL data on its scheduling-cell (605), and DL data on the scheduled-cells within its cross-scheduling group (601). The 1st scheduling cell (605) is further configured to provide scheduling information for the reception of DL data on some scheduled-cells (607s) in the cross-scheduled group '01' (602). Other cells in the cross-scheduled group '01' (602) are configured as self-scheduling cells (608s).

Similarly, the 2nd scheduling cell (606) is configured to transmit DCI providing scheduling information for the reception of DL data on its scheduling-cell (606) and DL data on some scheduled-cells (609s) within its cross-scheduling group (603). Within the 2nd cross-scheduling group (603), some cells are configured as self-scheduling cell(s) (610). The eNB also configures the Rel'13 UE with the set of 4 PUCCH resource indexes [5, 11, 29, and 8] (611).

On a particular DL subframe, the 2-bits of the TPC on the detected DCI intended for DL data reception on the scheduling-cells (605 and 606) provide the 1st power control (620) and 2nd power control (621) to be used on the associated PUCCHs. The 2-bits of the TPC on the detected DCIs intended for DL data reception on the scheduled-cells within a configured cross-scheduled group provides cross-scheduled group index (622). In FIG. 14, the (soft or selective) combined 2-bits of the TPC on the detected DCIs for scheduled-cells within the configured cross-scheduling groups (601 and 603) give values of '11'=3 (623) and '00'=0 (624) indicating the dynamically configured 1st and 2nd PUCCH resource index of '8' and '5' respectively. Concurrently on the same DL subframe, the (soft or selective) combined 2-bits of the TPC on the detected DCIs on self-scheduling cells (608s) within the cross-scheduled group '01' (602) give a value of '11'=3 providing the UE the 1st specific PUCCH resource index offset (625) to be used with the 1st PUCCH resource index of '8' (623) to give the 1st reference PUCCH resource index of 23 (627). Additionally, the (soft or selective) combined 2-bits of the TPC on the detected DCIs on self-scheduling cells (610) within the cross-scheduling group '10' (603) give a value of '00'=0 providing the UE the 2nd specific PUCCH resource index offset (626) to be used with the 2nd PUCCH resource index of '5' (624) to give the 2nd reference PUCCH resource index of 5 (628).

Simultaneously on the same DL subframe, the (soft or selective) combined 2-bits of the TPC on the detected DCIs in the self-scheduling group '11' (604) may give a value of '11'=3, and this provides the UE the commonly configured PUCCH resource index offset of 3 (629) to be used with all detected PUCCH resource indexes (i.e. 1st and 2nd reference PUCCH resource indexes). By using the specific configured PUCCH resource indexes with values of 23 (627), and 5 (628) and common configured PUCCH resource index offset of 3 (629), the UE may select the consecutive PUCCH resource indexes [38, 43 . . . ] (630) and [20, 25 . . . ] (631) in time-frequency for the mapping of the associated PUCCHs carrying UE feedback. The PUCCHs mapped on PUCCH resource indexes [38, 43 . . . ] (630) and [20, 25 . . . ] (631) may be further configured to have different transmit-power levels that follow the 1st power control command and 2nd power control command allowing for multiple PUCCHs mapping and transmission.

A number of important characteristics and advantages of the present proposal will be evident from the discussions and explanations provided above. Some of these characteristics and advantages are summarised in the points below, although it is to be clearly understood that these points are simply summaries and they are not intended to be (and are not) exhaustive of the important features and characteristics of the proposal or of the advantages it provides.

In self-scheduling carrier aggregation, the introduction of PUCCH resource index offsets and the utilisation of unused TPC fields for dynamic signalling of the offset values helps to increase flexibility in PUCCH resource allocation on a subframe basis at the eNB without changing or modifying existing physical layer channel design.

In cross-carrier-scheduling carrier aggregation, the introduction of mapping a 5-bit servicing cell index for supporting 32 CCs to 3-bits Rel'10 CIF, servicing cell index grouping and utilisation of unused TPC fields to indicate group index and cross-carrier scheduling can be realised for up-to 32 cells or CCs (i.e. 1 scheduling cell and 31 scheduled cell) without modifying physical layer signalling.

The introduction of additional CA configuration and procedures to be implemented at eNB and UE allows coexistence of cross-carrier scheduling and self-scheduling to be configured for a UE, and additionally the introduction of PUCCH resource index offsets and the smart utilisation of unused TPC fields for dynamic signalling of the specific and common offset values further helps to increase flexibility in PUCCH resource allocation on a subframe basis at the eNB without changing or modifying existing physical layer channel design.

The proposal may therefore help to:
realise full backward compatibility to Rel'10 CA with no physical layer architecture and design impact;
enhance RRC signalling and procedures for use at the eNB and Rel'13 UE in a scalable manner by extending the cross-carrier scheduling from 5 CCs to 32 CCs without impacting physical layer design and architecture;
provide the eNB with extra flexibility in PUCCH resource allocation by introducing specific and common PUCCH resource index offsets on a subframe basis and by providing a method for dynamic signalling by utilising unused DCI fields;
provide a method to enable the coexistence of cross-carrier scheduling and self-scheduling CA operations at Rel'13 UE on a CC basis where the self-scheduling can be configured to mutually support the cross-carrier operation.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

REFERENCE SIGNS LIST

70 WIRELESS COMMUNICATION SYSTEM
71, 72, 73, 74 WIRELESS ACCESS POINT
75 UE

The invention claimed is:

1. A control signaling method for use in an advanced wireless communication system, the wireless communication system including:
an Evolved NodeB (eNB); and
at least one advanced user equipment (UE),
wherein the wireless communication system is capable of carrier aggregation (CA) with up to 32 downlink (DL) component carriers (CCs) but only a single uplink (UL) CC, and control signaling between the eNB and a UE is operable in the following CA modes:
a self-scheduling mode wherein the control signaling method comprises performing control signaling between the eNB and the UE such that all CCs are configured as self-scheduling CCs;
a cross-carrier scheduling mode wherein the control signaling method comprises performing control signaling between the eNB and the UE such that one or more DL CC(s) is/are configured as scheduling CC(s) which provide scheduling information for DL data reception at the UE on the remaining CCs as scheduled CCs; and
a hybrid CA mode wherein the control signaling method comprises performing control signaling between the eNB and the UE such that the UE is configured to operate in the cross-carrier scheduling mode on a group or groups of DL CCs and in the self-scheduling mode on the remaining DL CCs.

2. The control signaling method according to claim 1, wherein performing control signaling between the eNB and the UE includes transmitting a 5-bit Radio Resource Control (RRC) parameter for identifying an advanced servicing-cell corresponding to each CC, wherein the 5-bit RRC parameter is divided into 4 advanced servicing-cell-index groups and each servicing-cell-index group has at most 8 CCs and is identified with a legacy service-cell-index.

3. The control signaling method according to claim 2 wherein, in the 5-bit RRC parameter, either the 2 most-significant bits or the 2 least-significant bits in the 5-bit string are used for identifying group indexes and the remaining 3-bits are used for identifying the legacy serving cell indexes within a group.

4. The control signaling method according to claim 2 wherein, when all CCs in a servicing-cell-index group are configured as self-scheduling CCs that servicing-cell-index group is a self-scheduling group, and each self-scheduling CC comprises a UE Specific Search Space (USS) within its control region providing scheduling information for reception in that CC's own data region of scheduled Physical Downlink Shared Channel (PDSCH) transmission.

5. The control signaling method according to claim 2 wherein a servicing-cell-index group is a cross-scheduling group when at most one CC in that group is configured as a cross-carrier scheduling CC providing scheduling information for the reception of scheduled Physical Downlink Shared Channels (PDSCHs) on that DL CC itself and on other DL CC(s) in that group.

6. The control signaling method according to claim 5, wherein the said one cross-carrier scheduling CC also provides scheduling information for the reception of scheduled PDSCH on DL CCs in other groups.

7. The control signaling method according to claim 6 wherein, within the control region on the said cross-carrier scheduling CC, the USS(s) configured for transmitting another group's or groups' CCs scheduling information do(es) not overlap with one or more UE Specific Search Space(s) (USS(s)) configured for transmitting that CC's own group's CCs scheduling information.

8. The control signaling method according to claim 2 wherein, when a servicing-cell-index group does not have a scheduling CC and one or more CCs in that group are cross-scheduled by a scheduling CC in another group, that servicing-cell-index group is a cross-scheduled group.

9. The control signaling method according to claim 2 wherein, in the self-scheduling mode, the method further comprises sending by the eNB to a UE, via a RRC connection, a CA configuration message that:
disables cross-carrier scheduling;
configures serving cell index groups, self-scheduling cells and serving cell indexes;
configures a set of 4 or more Physical Uplink Control Channel (PUCCH) resource indexes; and
configures USS on the configured self-scheduling cells.

10. The control signaling method according to claim 9 wherein a UE is configured with one UL/DL CC pair on which it makes an initial random access (the primary component carrier (PCC or PCell)), and also with additional CCs (the secondary component carriers (SCCs or SCells)), and in the servicing-cell-index group that has the PCell (the primary group), on a subframe that the PCell schedules for DL data reception at the UE, the PCell's scheduler uses 2-bits of Transmit Power Control (TPC) transmitted in downlink control information (DCI) to inform the UE of a power control command to be used on the associated PUCCH that carries UE feedback.

11. The control signaling method according to claim 9 wherein, on a DL subframe basis, the UE monitors the configured USS on a Primary Cell (PCell) for intended Downlink Control Information (DCI), and the 2-bits of a Transmit Power Control (TPC) on a detected DCI provide the UE with a power command to be used in transmitting PUCCH carrying UE feedback on an associated Uplink (UL) subframe.

12. The control signaling method according to claim 2 wherein, in the cross-carrier scheduling mode, the method comprises sending by the eNB to a UE, via a RRC connection, a CA configuration message that:
enables cross-carrier scheduling;
configures serving cell index groups, scheduling cells and associated scheduled cells;
configures a set of 4 or more Physical Uplink Control Channel (PUCCH) resource indexes; and
configures USS on the configured scheduling cells with the restriction that UE Specific Search Spaces (USSs)

for DL CCs within the cross-scheduling group should not overlap with USSs for DL CCs in other cross-scheduled groups.

13. The control signaling method according to claim 12 wherein, in a configured cross-scheduling group and on the scheduling cell, on a subframe that the scheduling-cell schedules for DL data reception on the scheduling cell at the UE, the scheduling cell's scheduler uses 2-bits of a Transmit Power Control (TPC) transmitted in a Downlink Control Information (DCI) to inform the UE of a power control command to be used on the associated PUCCH that carries UE feedback.

14. The control signaling method according to claim 12 wherein, in the cross-carrier scheduling mode, the signaling via the RRC connection further:
enables cross-carrier scheduling;
configures serving cell index groups, scheduling cells and associated scheduled cells;
configures a set of 4 or more PUCCH resource indexes; and
configures USS on the configured scheduling cells for scheduled cells in the cross-scheduling group and/or scheduled cells in the cross-scheduled groups.

15. The control signaling method according to claim 2 wherein, in the hybrid CA mode, the method further comprises sending by the eNB to a UE, via a RRC connection, a CA configuration message that:
enables cross-carrier scheduling and self-scheduling;
configures serving cell index groups, scheduling cells and associated scheduled cells, and self-scheduling cells;
configures a set of 4 or more Physical Uplink Control Channel (PUCCH) resource indexes;
configures USS on the configured scheduling cells with the restriction that USSs for DL CCs within the cross-scheduling group should not overlap with UE Specific Search Spaces (USSs) for DL CCs in other cross-scheduled groups; and
configures USS on the configured self-scheduling cells.

16. The control signaling method according to claim 15 wherein, in a configured cross-scheduling group and on the scheduling cell, on a subframe that the scheduling-cell schedules for DL data reception on the scheduling cell at the UE, the scheduling cell's scheduler uses 2-bits of the TPC field in the transmitted DCI to inform the UE of a power control command to be used on the associated PUCCH that carries UE feedback.

17. The control signaling method according to claim 15 wherein, in the hybrid CA mode, within a cross-scheduling group and/or cross-scheduled group, the eNB is further operable to configure one or more cells as self-scheduling cells.

18. The control signaling method according to claim 15 wherein, in the hybrid CA mode, the eNB is also operable to configure one or more groups as self-scheduling group(s), and on a subframe that a self-scheduling cell schedules for DL data reception at the UE, the self-scheduling cell's scheduler may use 2 unused bits of a Transmit Power Control (TPC) field in the transmitted DCI to inform the UE of the common PUCCH resource index offset to be used on all transmitted PUCCH resource indexes, and the UE assumes that the same TPC value is used on all self-scheduling cells in a self-scheduling group.

19. The control signaling method according to claim 15 wherein, on a DL subframe basis, the UE monitors the configured USS on a scheduling cell for intended scheduling-cell Downlink Control Information (DCI), and the 2-bits of a Transmit Power Control (TPC) on a detected DCI for the scheduling cell provides the UE with a power control command to be used on transmitting PUCCH carrying feedback on an associated UL subframe.

20. The control signaling method according to claim 15 wherein, in the hybrid CA mode the UE is configured with one or more self-scheduling cell(s), and any self-scheduling cell(s) are operable to be configured in a cross-scheduling group(s) and/or in associated cross-scheduled group(s), or in self-scheduling group(s).

* * * * *